United States Patent
Provost

(10) Patent No.: US 12,517,073 B2
(45) Date of Patent: Jan. 6, 2026

(54) TOPICAL COMPOSITION TESTING METHOD AND APPARATUS

(71) Applicant: Futura Medical Developments Limited, Guildford (GB)

(72) Inventor: James Andrew Provost, Guildford (GB)

(73) Assignee: FUTURA MEDICAL DEVELOPMENTS LIMITED, Guildford (GB)

( * ) Notice: Subject to any disclaimer, the term of this patent is extended or adjusted under 35 U.S.C. 154(b) by 0 days.

(21) Appl. No.: 18/422,829

(22) Filed: Jan. 25, 2024

(65) Prior Publication Data

US 2025/0244269 A1 Jul. 31, 2025

(51) Int. Cl.
*G01N 25/20* (2006.01)
*A61B 5/00* (2006.01)
(Continued)

(52) U.S. Cl.
CPC ............. *G01N 25/20* (2013.01); *B01L 7/02* (2013.01); *A61B 5/0008* (2013.01); *A61B 5/01* (2013.01);
(Continued)

(58) Field of Classification Search
CPC ......... G01N 25/20; B01L 7/02; A61B 5/0008; A61B 5/01
See application file for complete search history.

(56) References Cited

U.S. PATENT DOCUMENTS

| 6,435,710 B1 * | 8/2002 | Fauske ................. H05B 1/0247 |
| | | 374/45 |
| 8,951,553 B2 * | 2/2015 | Davis ........................ A61P 9/08 |
| | | 424/449 |

(Continued)

FOREIGN PATENT DOCUMENTS

| EP | 1927656 A1 * | 6/2008 | ........... C12N 5/0698 |
| WO | 87/02051 A1 | 4/1987 | |

(Continued)

OTHER PUBLICATIONS

Angus M. Hunter, et al., Influence of Topically Applied Menthol Cooling Gel on Soft Tissue Thermodynamics and Arterial and Cutaneous Blood Flow at Rest, The International Journal of Sports Physical Therapy, vol. 13, No. 3, p. 483-492, DOI: 10.26603/ijspt20180483 (Year: 2018).*

(Continued)

*Primary Examiner* — Sean P Dougherty
(74) *Attorney, Agent, or Firm* — Stites & Harbison, PLLC; Terry L. Wright

(57) ABSTRACT

There is described a method of testing a topical composition, wherein the method comprises: providing an ex vivo tissue comprising a skin tissue layer and a muscle tissue layer, wherein at least one temperature probe is positioned on the surface of the skin tissue layer; adjusting the temperature of the ex vivo tissue such that the temperature at the surface of the skin tissue layer is 32-37° C.; applying the topical composition to the surface of the skin tissue layer, wherein the topical composition effects a decrease in temperature at the surface of the skin tissue layer; measuring the decrease in temperature at the surface of the skin tissue layer over time effected by the topical composition using the at least one temperature probe; and measuring a subsequent increase (Continued)

in temperature at the surface of the skin tissue layer over time using the at least one temperature probe.

21 Claims, 12 Drawing Sheets

(51) Int. Cl.
 *A61B 5/01* (2006.01)
 *B01L 7/02* (2006.01)
(52) U.S. Cl.
 CPC . *B01L 2300/042* (2013.01); *B01L 2300/0663* (2013.01); *B01L 2300/185* (2013.01); *G01N 2500/10* (2013.01)

(56) References Cited

U.S. PATENT DOCUMENTS

| | | | |
|---|---|---|---|
| 9,265,721 B2* | 2/2016 | Davis | A61K 47/32 |
| 2009/0298113 A1* | 12/2009 | Vielhaber | G01N 33/5088 435/29 |
| 2014/0140371 A1* | 5/2014 | Kieliszek | G01K 13/02 374/134 |
| 2016/0033432 A1* | 2/2016 | Han | G01K 13/00 374/43 |
| 2021/0000757 A1* | 1/2021 | Davis | A61K 31/04 |

FOREIGN PATENT DOCUMENTS

| | | | |
|---|---|---|---|
| WO | 00/03208 A1 | 1/2000 | |
| WO | 2003/036280 A2 | 5/2003 | |
| WO | 2007/021844 A2 | 2/2007 | |
| WO | WO-2008070198 A2 * | 6/2008 | B01L 3/508 |
| WO | 2008/084442 A1 | 7/2008 | |
| WO | 2009/063016 A1 | 5/2009 | |
| WO | 2012/154364 A1 | 11/2012 | |
| WO | 2013/140301 A1 | 9/2013 | |
| WO | WO-2014028734 A1 * | 2/2014 | A61K 38/19 |
| WO | 2016/001978 A1 | 1/2016 | |
| WO | 2016/133812 A1 | 8/2016 | |
| WO | WO-2021116651 A1 * | 6/2021 | A61K 31/417 |
| WO | 2021/132768 A1 | 7/2021 | |
| WO | 2023/078870 A2 | 5/2023 | |

OTHER PUBLICATIONS

Y-G Im, et al., Comparison of changes in facial skin temperaturecaused by ethyl chloride spraying, ice block rubbingand cold gel packing in healthy subjects, J Oral Rehabil., 39(12):931-40. doi: 10.1111/joor.12007 (Year: 2012).*
U.S. Department of Health and Human Services, Food and Drug Administration, Center for Drug Evaluation and Research (CDER), In Vitro Permeation Test Studies for Topical Drug Products Submitted in ANDAs Guidance for Industry, Generic Drugs (Year: 2022).*
Jee-hyun Hwang, et al., Ex Vivo Live Full-Thickness Porcine Skin Model as a Versatile In Vitro Testing Method for Skin Barrier Research, International Journal of Molecular Sciences, Int. J. Mol. Sci. 2021, 22, 657. https://doi.org/10.3390/ijms22020657 (Year: 2021).*
Anonymous: "Experiment 9: Evaporation and Intermolecular Attractions", Chemistry with Calculators, Jan. 1, 2000, pp. 1-8.
Hunter, Angus M., et al.: "Influence of Topically Applied Menthol Cooling Gel on Soft Tissue Thermodynamics and Arterial and Cutaneous Blood Flow at Rest", International Journal of Sports Physical Therapy, vol. 13, No. 3, Jun. 1, 2018, pp. 483-492.
Korbanova, Ekaterina G.: "Measurement of the temperature profile during evaporation of water and ethanol", Matec Web of Conferences, vol. 92, Dec. 21, 2016, p. 01045.
Ivens, U.I., et al.: "Ointment is evenly spread on the skin, in contrast to creams and solutions", British Journal of Dermatology, vol. 145, No. 2, Aug. 1, 2001, pp. 264-267.
Wu, Edward C., et al.: Ex vivo investigations of laser auricular cartilage reshaping with carbon dioxide spray cooling in a rabbit model, Lasers in medical science 28 (2013): 1475-1482.
Levin, Yakir S., et al.: Multifunctional patch for use during laser procedures: Optimization and feasibility testing.Lasers in Surgery and Medicine 54, No. 1 (2022): 182-188.
Kosir, Jure, et al.: Non-contact monitoring of the depth temperature profile for medical laser scanning technologies. Scientific reports 10, No. 1 (2020): 20242.
Boekema, Bouke, et al.: Antibacterial and safety tests of a flexible cold atmospheric plasma device for the stimulation of wound healing. Applied Microbiology and Biotechnology 105 (2021): 2057-2070.
Hübner, Frank, et al.: Validating a simulation model for laser-induced thermotherapy using MR thermometry. International Journal of Hyperthermia 39, No. 1 (2022): 1315-1326.
Guo, Shoujing, et al.: Intraoperative Speckle Variance Optical Coherence Tomography for Tissue Temperature Monitoring During Cutaneous Laser Therapy. IEEE Journal of Translational Engineering in Health and Medicine 7 (2019): 1-8.
Gillis, D. Jason, et al.: The influence of menthol dose on human temperature regulation and perception. Journal of Thermal Biology 92 (2020): 102659.
Lasanen, R., et al.: Menthol concentration in topical cold gel does not have significant effect on skin cooling. Skin Research and Technology 22, No. 1 (2016): 40-45.
Wang, Gang, et al.: Topical analgesic containing methyl salicylate and l—menthol accelerates heat loss during skin cooling for exercise-induced hyperthermia. Frontiers in Physiology 13 (2022): 945969.
Bilkhu, Paramdeep, et al.: Investigating the subjective cooling effect of eyelid cleansing gel on eyelid and ocular surface temperature. Contact Lens and Anterior Eye 42, No. 4 (2019): 411-414.

* cited by examiner

TOPICAL COMPOSITION TESTING METHOD AND APPARATUS

FIELD OF THE INVENTION

The present invention relates to a method of and apparatus for testing a topical composition, particularly a topical composition for treating erectile dysfunction. The present invention also relates to a process of applying for regulatory approval of a composition for treating erectile dysfunction.

BACKGROUND TO THE INVENTION

Topical compositions for treating erectile dysfunction by exerting a temperature change on the skin are known in the art. WO 2021/116651 describes such compositions. However, testing these compositions for their temperature change effect remains challenging without using clinical subjects, as there are no suitable penile skin in vitro or ex vivo models available.

SUMMARY OF THE INVENTION

According to a first aspect, there is provided a method of testing a topical composition, wherein the method comprises: providing an ex vivo tissue comprising a skin tissue layer and a muscle tissue layer, wherein at least one temperature probe is positioned on the surface of the skin tissue layer; adjusting the temperature of the ex vivo tissue such that the temperature at the surface of the skin tissue layer is 32-37° C.; applying the topical composition to the surface of the skin tissue layer, wherein the topical composition effects a decrease in temperature at the surface of the skin tissue layer; measuring the decrease in temperature at the surface of the skin tissue layer over time effected by the topical composition using the at least one temperature probe; and measuring a subsequent increase in temperature at the surface of the skin tissue layer over time using the at least one temperature probe.

Advantageously, the method can be used to test topical compositions for efficacy in producing a cooling effect on the skin. For example, the method can be used to test topical compositions for efficacy in treating erectile dysfunction. The cooling effect, and subsequent temperature recovery, can be accurately measured and demonstrated in the method, using an ex vivo tissue with thermo-physiological properties comparable to the clinical indication site. In addition, the use of ex vivo tissue means that clinical subjects or animal studies are not required to test and evidence the cooling effect of the topical compositions.

The topical composition may be any suitable topical composition that effects a temperature change at the surface of the skin. In some embodiments, the temperature change is a decrease in temperature at the surface of the skin. In some embodiments, the temperature change is a decrease in temperature at the surface of the skin followed by a recovery increase in temperature at the surface of the skin.

In some embodiments, the topical composition is any suitable topical composition that is for treating erectile dysfunction by effecting a temperature change at the surface of the skin. As an example, the topical composition may be for treating erectile dysfunction by effecting a decrease in temperature at the surface of the skin. As a further example, the topical composition may be for treating erectile dysfunction by effecting a decrease in temperature at the surface of the skin followed by a recovery increase in temperature at the surface of the skin.

The term "treating erectile dysfunction", as used herein, is intended to mean the reduction or elimination of the cause and/or one or more effects of erectile dysfunction. In specific embodiments, the term "treating erectile dysfunction" refers to the amelioration of at least one measurable physical parameter of erectile dysfunction.

The term "erectile dysfunction", as used herein, is a male sexual dysfunction characterised by the inability to develop or maintain an erection of the penis during sexual performance. A penile erection is the hydraulic effect of blood entering and being retained in sponge-like bodies within the penis. The process is often initiated as a result of sexual arousal, when signals are transmitted from the brain to nerves in the penis. Erectile dysfunction is indicated when an erection is difficult to produce. The most important organic causes are cardiovascular disease and diabetes, neurological problems (for example, trauma from prostatectomy surgery), hormonal insufficiencies (hypogonadism), drug side effects, and psychological effects (for example, performance anxiety).

The terms "effects a decrease in temperature at the surface of the skin tissue layer" and "by effecting a decrease in temperature at the surface of the skin", as used herein, are intended to mean that the topical composition exerts a cooling effect on the skin. In particular embodiments, the topical composition enhances production of endogenous NO by virtue of the latent heat of cooling as a volatile solvent component evaporates, stimulating the nerves locally and resulting in generation of endogenous NO. In the glans of the penis, there are sensors which are reactive to a range of physical sensations, such as and including touch, pressure and temperature, and topical application of the composition stimulates such sensors. Without wishing to be bound by theory, it is thought that the rapid cooling brought about by the composition followed by the recovery in temperature acts as a stimulant so that the sensors react synergistically and result in tumescence and erection.

In some embodiments, the topical composition does not contain any pharmaceutically active ingredients for the treatment of erectile dysfunction, for example, phosphodiesterase type 5 inhibitors (PDE5 inhibitors) such as tadalafil and sildenafil, and vasodilators such as glyceryl trinitrate (GTN), alprostadil and phentolamine mesilate. In some embodiments, the topical composition does not contain any pharmaceutically active ingredients at all.

Preferably, the topical composition is free of sildenafil and an acetylcholinesterase inhibitor. "Sildenafil" also encompasses salt forms, such as sildenafil citrate. The acetylcholinesterase inhibitor may be any acetylcholinesterase inhibitor such as Δ9-tetrahydrocannabinol (THC), physostigmine, neostigmine, pyridostigmine, ambenonium, demarcarium, rivastigmine, galantamine, caffeine, donepezil, tetrahydroaminoacridine, edrophonium, huperzine A, bis-huperzine A, bis-huperzine B, huperzine A-tacrine, derivatives of huperzine A, ladostigil, ungeremine, and lactucopicrin.

In some embodiments, the topical composition is free of compounds selected from PDE-5 inhibitors, amide anaesthetics, local anaesthetics, natural prostaglandins, synthetic prostaglandins, testosterone or combinations thereof. Preferably, the composition is free of PDE-5 inhibitors and amide anaesthetics.

The method can be used to test any topical composition that effects a decrease in the temperature at the surface of the skin. By way of example to aid the understanding of the test method, there is described a topical composition having the following ingredients in percentages by weight:

ethanol: 35%
water: 34%
glycerol: 24%
propylene glycol: 6%
Carbopol® Ultrez 10: 1%

Further compositions are described in WO 2021/116651 which is incorporated herein by reference in its entirety.

The ex vivo tissue may be any suitable ex vivo tissue that comprises a skin tissue layer and a muscle tissue layer. The term "ex vivo tissue", as used herein, is intended to mean tissue that has been obtained and removed from a living organism.

The skin tissue layer typically includes an epidermis and a dermis. By "epidermis" it is meant the skin barrier layer (i.e., outer-facing layer of the skin) that typically contains keratinocytes, melanocytes and Langerhans cells. By "dermis" it is meant the underlying tissue of the epidermis that contains a dense vascular and neural network, fibroblasts, resident immune cells and cornified appendages that extend through the epidermis, the tissue also including hair follicles, sebaceous glands, and sweat glands. In some embodiments, the skin tissue layer also includes a subcutaneous layer underlying the dermis.

The surface of the skin tissue layer may be any suitable size and shape that allows for application of the topical composition and measurement of the surface temperature. Typically, the surface of the skin tissue layer is square or rectangular, however, the skilled person will appreciate that many other regular and irregular shapes are possible and within the scope of the disclosure. In some embodiments, the area of the surface of the skin tissue layer is 10-1000 cm$^2$. In some embodiments, the area of the surface of the skin tissue layer is 15-750 cm$^2$. In some embodiments, the area of the surface of the skin tissue layer is 20-500 cm$^2$. In some embodiments, the area of the surface of the skin tissue layer is 25-250 cm$^2$. In some embodiments, the area of the surface of the skin tissue layer is 30-100 cm$^2$. In some embodiments the dimensions of the surface of the skin tissue layer are 8 cm×8 cm.

The thickness of the skin tissue layer is typically 2-4 mm.

The muscle tissue layer typically underlies the skin tissue layer and is intact with the skin tissue layer (i.e., the skin and muscle tissue layers are not separate layers that are subsequently attached together). The muscle tissue layer typically has the same length and width as the surface of the skin tissue layer. In some embodiments, the thickness of the muscle tissue layer is 20-100 mm. The thickness of the muscle tissue layer is typically 50-70 mm.

In some embodiments, at least one reference temperature probe is positioned within the muscle tissue layer (i.e., embedded in the muscle tissue layer). Typically, the at least one reference temperature probe is positioned approximately or precisely in the centre of the volume of the muscle tissue layer. The at least one reference temperature probe, which may also be referred to as a control temperature probe, is distinct from the at least one temperature probe positioned on the surface of the skin tissue layer. The at least one reference temperature probe may be any suitable calibrated sensor that can be used to measure the temperature of the muscle tissue layer. In some embodiments, the at least one reference temperature probe is a temperature probe thermometer. In some embodiments, the at least one reference temperature probe is the same type of temperature probe as the at least one temperature probe positioned on the surface of the skin tissue layer. In some embodiments, the at least one reference temperature probe is a class A Pt100 temperature probe thermometer (resolution of 0.1° C.).

In some embodiments, the ex vivo tissue is from an animal (i.e., ex vivo animal tissue). In some embodiments, the ex vivo tissue is from a mammal (i.e., ex vivo mammalian tissue). In some embodiments, the ex vivo tissue is from a pig (i.e., ex vivo porcine tissue). In some embodiments, the ex vivo tissue is from the back of a pig. The ex vivo tissue may include tissue obtained from slaughterhouses.

In some embodiments, the ex vivo tissue is refrigerated (e.g., incubated at 4° C.) prior to use in the method. In some embodiments, the ex vivo tissue is frozen prior to use in the method. In some embodiments, the ex vivo tissue is snap frozen prior to use in the method. In some embodiments, the ex vivo tissue is cultured in vitro prior to use in the method. In various embodiments, the ex vivo tissue is bioengineered in vitro prior to use in the method.

The at least one temperature probe may be any suitable calibrated sensor that can be used to measure the temperature at the surface of the skin tissue layer (for example, thermocouples or temperature probes). In some embodiments, the at least one temperature probe is a temperature probe thermometer. In some embodiments, the at least one temperature probe is a class A Pt100 temperature probe thermometer (resolution of 0.1° C.).

The at least one temperature probe positioned on the surface of the skin tissue layer may comprise any suitable number of temperature probes that allow the temperature at the surface of the skin tissue layer to be reliably measured. In some embodiments, the at least one temperature probe comprises at least two temperature probes positioned on the surface of the skin tissue layer. In some embodiments, the at least one temperature probe comprises at least three temperature probes positioned on the surface of the skin tissue layer. In some embodiments, the at least one temperature probe comprises at least four temperature probes positioned on the surface of the skin tissue layer. In some embodiments, the at least one temperature probe comprises at least five temperature probes positioned on the surface of the skin tissue layer.

The term "positioned on the surface of the skin tissue layer", as used herein, is intended to mean that the at least one temperature probe contacts the surface of the skin tissue layer in order to measure the temperature of the skin tissue layer at the surface. The at least one temperature probe may be affixed to the surface of the skin tissue layer by any suitable means or may be resting on the surface of the skin tissue layer. In other embodiments, the at least one temperature probe may be embedded just below the surface of the skin tissue layer (e.g., within 5 mm of the surface or within 2 mm of the surface or within 1 mm of the surface).

The at least one temperature probe may be positioned at any suitable location on the surface of the skin tissue layer that provides a reliable temperature measurement at the surface of the skin tissue layer. In some embodiments, the at least one temperature probe is positioned approximately or precisely at the centre of the surface of the skin tissue layer.

In embodiments where a plurality of temperature probes are positioned on the surface of the skin tissue layer, the plurality of temperature probes may be spread evenly or unevenly across the surface of the skin tissue layer. In particular embodiments, the plurality of temperature probes are positioned equidistantly on the surface of the skin tissue layer. In embodiments where at least three temperature probes are employed, a first of the at least three temperature probes may be positioned (e.g., approximately or precisely) at the centre of the surface of the skin tissue layer. A second and a third of the at least three temperature probes may be positioned at opposite edges of the surface of the skin tissue layer. In some embodiments, a second and a third of the at least three temperature probes are positioned diagonally at opposite edges of the surface of the skin tissue layer. In some embodiments, a second and a third of the at least three temperature probes are positioned 1-3 cm from opposite edges of the surface of the skin tissue layer. In some embodiments, the at least three temperature probes are positioned at least 2 cm away from opposite edges of the surface of the skin tissue layer.

The temperature of the ex vivo tissue may be adjusted in any suitable manner that ensures the temperature at the surface of the skin tissue layer is 32-37° C. after the adjusting step of the method and prior to the application of the topical composition. The term "adjusting the temperature", as used herein, is intended to cover altering the temperature of the ex vivo tissue (for example, increasing the temperature of the tissue from 0-8° C. to 32-37° C.) and/or maintaining the temperature of the ex vivo tissue at 32-37° C. The skilled person will recognise that various methods of adjusting the temperature of the ex vivo tissue may be employed, such as using a thermal bath (e.g., a water bath, dry bath or bead bath). In some embodiments, a water bath is employed. In some embodiments, a 14-litre capacity digital water bath is employed.

In some embodiments, adjusting the temperature of the ex vivo tissue comprises partially submerging the ex vivo tissue in a thermal bath such that the muscle tissue layer is submerged in the thermal bath and the surface of the skin tissue layer is exposed to air. In some embodiments, the thermal bath is a water bath. In some embodiments, the thermal bath (e.g., water bath) is maintained at 36-40° C. In some embodiments, the thermal bath (e.g., water bath) is maintained at 36-38° C. In some embodiments, the thermal bath (e.g., water bath) is maintained at around 37° C. The temperature of the thermal bath may be confirmed using a calibrated temperature probe (e.g., at several positions in the thermal bath, such as at the centre and four corners).

In various embodiments, adjusting the temperature of the ex vivo tissue comprises partially submerging the ex vivo tissue in a 36-40° C. thermal bath such that the muscle tissue layer is submerged in the thermal bath and is adjusted to 36-38° C., and wherein the surface of the skin tissue layer is exposed to air (e.g., at room temperature) and is adjusted to 32-37° C.

Typically, the adjustment step comprises a period of equilibration for the ex vivo tissue to arrive at the correct temperature. In some embodiments, the period of equilibration is approximately 2.5 hours.

In some embodiments, a cover is positioned on the thermal bath during the adjustment step and removed from the thermal bath during the application and measurement steps. The cover may be any suitable component that substantially covers the opening of the thermal bath. In some embodiments, the cover is a lid. In some embodiments, the cover is an insulating layer (e.g., a layer of bubble wrap). In some embodiments, the thermal bath is uncovered during the application and measurement steps.

The topical composition may be applied to the surface of the skin tissue layer in any suitable manner which brings the topical composition in contact with the surface of the skin tissue layer. In some embodiments, the topical composition is applied by dispensing an appropriate amount of the topical composition onto the surface of the skin tissue layer. In particular embodiments, the topical composition is applied by dispensing an appropriate amount of the topical composition onto the surface of the skin tissue layer and rubbing the topical composition into the surface of the skin tissue layer (e.g., by hand, by gloved hand, or by applicator such as a brush or spatula).

In particular embodiments, the topical composition is applied to a defined area of application. In some embodiments, the area of application of the topical composition has a surface area of 1-100 $cm^2$. In some embodiments, the area of application of the topical composition has a surface area of 2-75 $cm^2$. In some embodiments, the area of application of the topical composition has a surface area of 5-50 $cm^2$. In some embodiments, the area of application of the topical composition has a surface area of 7-25 $cm^2$. In some embodiments, the area of application of the topical composition has a surface area of 10-15 $cm^2$.

Any dose of the topical composition that is desired to be tested in the method may be applied to the surface of the skin tissue layer. In some embodiments, a 100-2000 mg dose of the topical composition is applied to the surface of the skin tissue layer. In some embodiments, a 100-1000 mg dose of the topical composition is applied to the surface of the skin tissue layer. In some embodiments, a 150-800 mg dose of the topical composition is applied to the surface of the skin tissue layer. In some embodiments, a 200-400 mg dose of the topical composition is applied to the surface of the skin tissue layer. In some embodiments, a 250-350 mg dose of the topical composition is applied to the surface of the skin tissue layer. In some embodiments, about a 300 mg dose of the topical composition is applied to the surface of the skin tissue layer.

The at least one temperature probe positioned on the surface of the skin tissue layer is used to measure the decrease in temperature at the surface of the skin tissue layer over time effected by the topical composition (i.e., the cooling effect) and the subsequent increase in temperature at the surface of the skin tissue layer over time (i.e., the temperature recovery). In other words, the measuring step(s) may comprise measuring, using the at least one temperature probe, the decrease in temperature at or of the surface of the skin effected by the topical composition and the subsequent recovery of the temperature at or of the surface of the skin.

The skilled person will recognise that the term "measuring", as used herein, covers determining and recording the temperature in real-time, as well as recording the temperature readout over time (for example by video camera) and reviewing the footage at a later timepoint.

The temperature at the surface of the skin tissue layer may be measured for any suitable length of time following the application of the topical composition that records the decrease in temperature at the surface of the skin tissue layer (i.e., the cooling effect exerted by the topical composition) and the subsequent increase in temperature at the surface of the skin tissue later (i.e., the recovery of temperature at the surface of the skin tissue layer).

In some embodiments, the decrease and subsequent increase in temperature at the surface of the skin tissue layer is measured for a total of 2-40 minutes. In some embodiments, the decrease and subsequent increase in temperature at the surface of the skin tissue layer is measured for a total of 3-30 minutes. In some embodiments, the decrease and subsequent increase in temperature at the surface of the skin tissue layer is measured for a total of 4-25 minutes. In some embodiments, the decrease and subsequent increase in temperature at the surface of the skin tissue layer is measured for a total of 5-20 minutes.

In some embodiments, the decrease and subsequent increase in temperature at the surface of the skin tissue layer is measured for a total of 6-16 minutes. In some embodiments, the decrease and subsequent increase in temperature at the surface of the skin tissue layer is measured for a total of 8-14 minutes. In some embodiments, the decrease and subsequent increase in temperature at the surface of the skin tissue layer is measured for a total of 10-12 minutes. In some embodiments, the decrease and subsequent increase in temperature at the surface of the skin tissue layer is measured for about 12 minutes.

In some embodiments, the decrease and subsequent increase in temperature at the surface of the skin tissue layer is measured for the time taken for the temperature at the surface of the skin tissue layer to return to 32-37° C. (e.g., as determined by the at least one temperature probe positioned on the surface of the skin tissue layer). In some embodiments, the decrease and subsequent increase in temperature at the surface of the skin tissue layer is measured for the time taken for the surface of the skin tissue layer to return to its starting temperature (e.g., as determined by the at least one temperature probe positioned on the surface of the skin tissue layer). Typically, the starting temperature is the temperature the surface of the skin tissue layer is adjusted to in the adjustment step.

In some embodiments, the decrease in temperature at the surface of the skin tissue layer is measured for 1-20 minutes. In some embodiments, the decrease in temperature at the surface of the skin tissue layer is measured for 2-15 minutes. In some embodiments, the decrease in temperature at the surface of the skin tissue layer is measured for 3-10 minutes. In some embodiments, the decrease in temperature at the surface of the skin tissue layer is measured for 3-8 minutes. In some embodiments, the decrease in temperature t the surface of the skin tissue layer is measured for 4-7 minutes. In some embodiments, the decrease in temperature at the surface of the skin tissue layer is measured for 5-6 minutes.

In some embodiments, the subsequent increase in temperature at the surface of the skin tissue layer is measured for 1-20 minutes. In some embodiments, the subsequent increase in temperature at the surface of the skin tissue layer is measured for 2-15 minutes. In some embodiments, the subsequent increase in temperature at the surface of the skin tissue layer is measured for 3-10 minutes. In some embodiments, the subsequent increase in temperature at the surface of the skin tissue layer is measured for 3-8 minutes. In some embodiments, the subsequent increase in temperature at the surface of the skin tissue layer is measured for 4-7 minutes. In some embodiments, the subsequent increase in temperature at the surface of the skin tissue layer is measured for 5-6 minutes.

The skilled person will recognise that the number of temperature measurements taken over the period of measurement is not particularly limited, provided the decrease and subsequent increase in temperature at the surface of the skin tissue layer can be reliably measured. In some embodiments, at least one temperature measurement is taken per minute. In some embodiments, at least two temperature measurements are taken per minute. In some embodiments, at least three temperature measurements are taken per minute. In some embodiments, at least four temperature measurements are taken per minute. In some embodiments, at least five temperature measurements are taken per minute. In some embodiments, at least six temperature measurements are taken per minute. In some embodiments, at least 10 temperature measurements are taken per minute. In some embodiments, at least 20 temperature measurements are taken per minute. In some embodiments, at least 30 temperature measurements are taken per minute. In some embodiments, at least 40 temperature measurements are taken per minute. In some embodiments, at least 50 temperature measurements are taken per minute. In some embodiments, at least 60 temperature measurements are taken per minute.

In some embodiments, temperature measurements are taken at 10 second intervals, 15 second intervals, 20 second intervals, 25 second intervals, 30 second intervals, 35 second intervals, 40 second intervals, 45 second intervals, 50 second intervals, 55 second intervals, 60 second intervals, or any combination thereof. In various embodiments, temperature measurements are taken at 10 second intervals in the first minute, 15 second intervals in the second minute, 30 second intervals in the third and fourth minutes, and 60 second intervals in the remaining minutes (e.g., in the fifth to eleventh minutes).

In some embodiments, the method further comprises the steps of: removing residue of the topical composition from the surface of the skin tissue layer; and repeating the method to obtain experimental replicates. The term "residue" refers to the substance remaining on the surface of the skin tissue layer after the application of the topical composition and the measuring steps (e.g., the non-evaporated components from the topical composition). The removal step may be by any suitable technique that largely or fully removes the residue of the topical composition, such as wiping with a dry or wet cloth.

In some embodiments, the method further comprises the step of comparing the temperature data against a control. The term "temperature data", as used herein, refers to the temperature measurements collected in both of the measuring steps. In some embodiments, the control is an identical ex vivo tissue that has not had a topical composition applied to the surface of the skin tissue layer. Accordingly, in some embodiments, the control is tested in the following manner: providing a control ex vivo tissue comprising a skin tissue layer and a muscle tissue layer, wherein at least one temperature probe is positioned on the surface of the skin tissue layer; adjusting the temperature of the control ex vivo tissue such that the temperature at the surface of the skin tissue layer is 32-37° C.; and measuring the temperature at the surface of the skin tissue layer over time using the at least one temperature probe.

In a second aspect, there is provided an apparatus for testing a topical composition, wherein the apparatus comprises: an ex vivo tissue comprising a skin tissue layer and a muscle tissue layer; at least one temperature probe positioned on the surface of the skin tissue layer; and a temperature adjustment mechanism arranged to adjust the temperature of the ex vivo tissue such that the temperature at the surface of the skin tissue layer can be adjusted to 32-37° C.

The description above in relation to the topical composition, the ex vivo tissue, and the at least one temperature probe is equally applicable to this aspect.

In some embodiments, the at least one temperature probe comprises at least three temperature probes positioned on the surface of the skin tissue layer. In some embodiments, a first of the at least three temperature probes is positioned at the centre of the surface of the skin tissue layer. In some embodiments, a second and a third of the at least three temperature probes are positioned at opposite edges of the surface of the skin tissue layer.

In some embodiments, the apparatus further comprises at least one reference temperature probe positioned within the muscle tissue layer. The description above in relation to the at least one reference temperature probe is equally applicable to this aspect.

In some embodiments, the ex vivo tissue is ex vivo mammalian tissue. In some embodiments, the ex vivo tissue is ex vivo porcine tissue.

In some embodiments, the area of the surface of the skin tissue layer is 30-100 cm$^2$.

Any suitable temperature adjustment mechanism may be employed provided it is capable of adjusting the temperature at the surface of the skin tissue layer to 32-37° C. The term "temperature adjustment mechanism", as used herein, is intended to cover mechanisms that alter the temperature of the ex vivo tissue (for example, increasing the temperature of the tissue from 0-8° C. to 32-37° C.) and/or mechanisms that maintain the temperature of the ex vivo tissue at 32-37° C. The skilled person will recognise that various temperature adjustment mechanisms may be employed, such as using a thermal bath (e.g., a water bath, dry bath or bead bath). In some embodiments, the temperature adjustment mechanism comprises a thermal bath. In some embodiments, the temperature adjustment mechanism comprises a water bath. In some embodiments, the temperature adjustment mechanism comprises a 14-litre capacity digital water bath. In some embodiments, the thermal bath (e.g., water bath) comprises a cover.

In some embodiments, the ex vivo tissue is partially submerged in the thermal bath such that the muscle tissue layer is submerged in the thermal bath and the surface of the skin tissue layer is exposed to air.

In some embodiments, the thermal bath (e.g., water bath) is maintained at 36-40° C. In some embodiments, the thermal bath (e.g., water bath) is maintained at 36-38° C. In some embodiments, the thermal bath (e.g., water bath) is maintained at around 37° C. In some embodiments, the thermal bath (e.g., water bath) is maintained at around 38° C. In some embodiments, the thermal bath (e.g., water bath) is maintained at around 39° C.

In various embodiments, the ex vivo tissue is partially submerged in a 36-40° C. thermal bath such that the muscle tissue layer is submerged in the thermal bath and is 36-38° C., and the surface of the skin tissue layer is exposed to air and is 32-37° C.

In a third aspect, there is provided a process of applying for regulatory approval of a composition for treating erectile dysfunction, wherein the process comprises submitting experimental data for the composition obtained using the method described above.

In some embodiments, the experimental data is submitted to the United States Food and Drug Administration.

In some embodiments, applying for regulatory approval is a 501(k) submission.

In a fourth aspect, there is provided a method of testing a topical composition, wherein the method comprises: providing an ex vivo porcine tissue comprising a skin tissue layer and a muscle tissue layer, wherein at least three temperature probes are positioned on the surface of the skin tissue layer; adjusting the temperature of the ex vivo porcine tissue such that the temperature at the surface of the skin tissue layer is 32-37° C.; applying a topical composition to the surface of the skin tissue layer, wherein the topical composition effects a decrease in temperature at the surface of the skin tissue layer; measuring the decrease in temperature at the surface of the skin tissue layer for at least 3 minutes using the at least three temperature probes; and measuring a subsequent increase in temperature at the surface of the skin tissue layer for at least 3 minutes using the at least three temperature probes.

In some embodiments, the topical composition is for treating erectile dysfunction.

The description above in relation to the first aspect is equally applicable to this aspect.

Where applicable or not specifically disclaimed, any one of the embodiments described herein are contemplated to be able to be combined with any other one or more embodiments, even though the embodiments are described under different aspects of the disclosure.

The foregoing and other objects, features and advantages of the disclosure will become more apparent from the following detailed description, which proceeds with reference to the accompanying figures.

BRIEF DESCRIPTION OF THE DRAWINGS

The invention will now be described in detail by way of example only with reference to the figures in which.

DETAILED DESCRIPTION OF THE INVENTION

Figure 1:
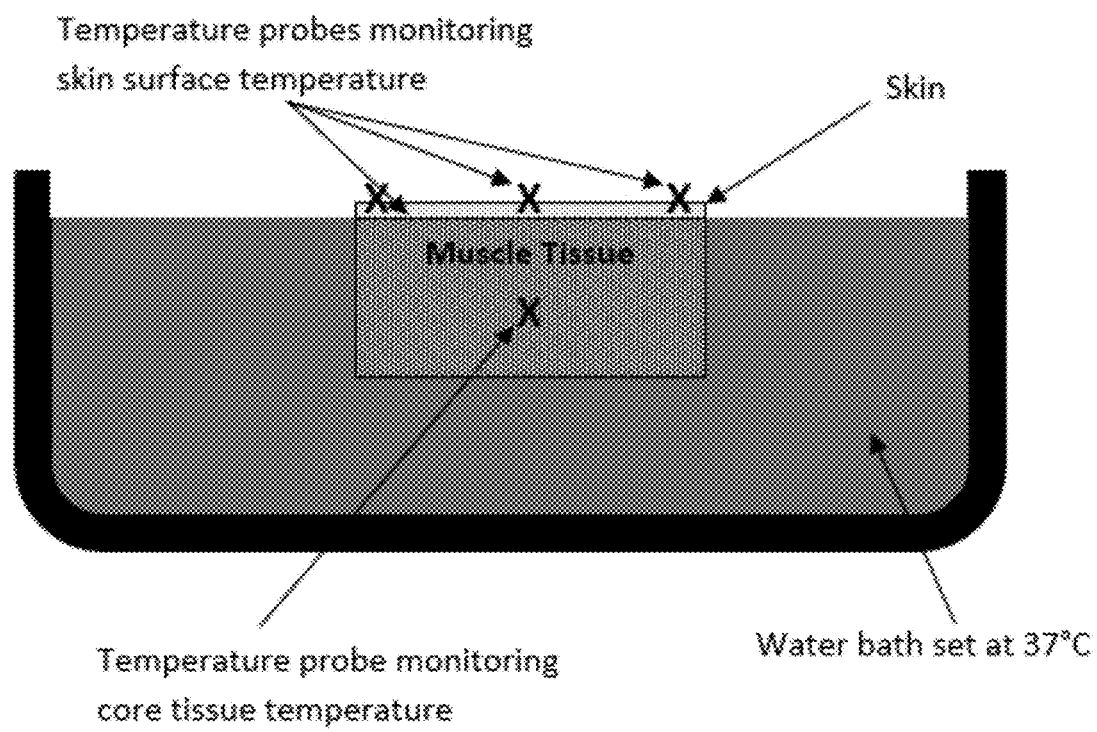
FIG. 1 shows a schematic representation of an exemplary experimental setup.
Figure 2:
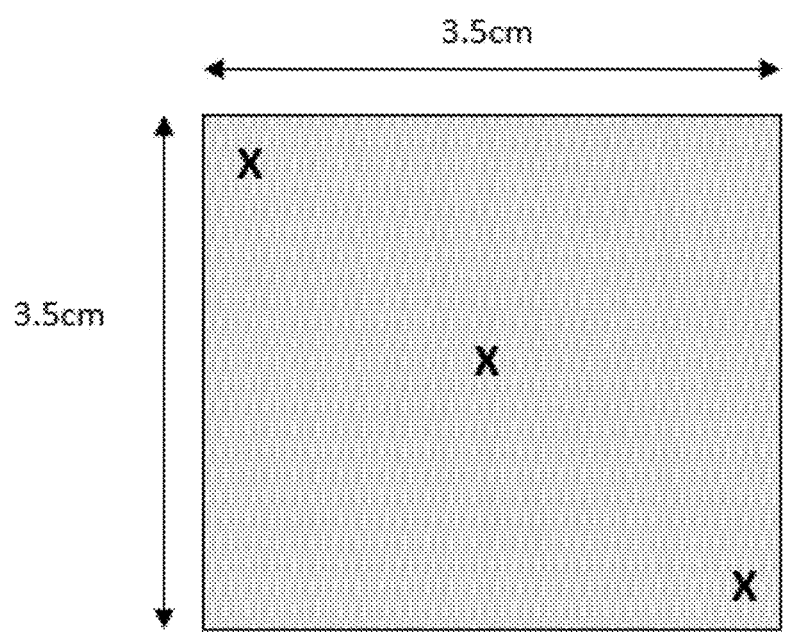
FIG. 2 shows a schematic representation of an exemplary positioning of temperature probes on the ex vivo tissue surface.

The inventors have developed and tested a method for assessing the thermal effects of topical compositions that are used, for example, for treating erectile dysfunction. In the following example, the inventors have used the method to conduct an assessment of the thermal effects of an exemplary topical composition (the MED3000 composition) when applied to an ex vivo tissue under simulated clinical conditions of use. The method is used to demonstrate the thermal characteristics of the topical composition (i.e. creating a rapid, localized cooling effect followed by a recovering warming effect) which can provide regulatory authorities (such as the FDA) with an understanding of factors which may influence safety and effectiveness.

EXAMPLE

Introduction

This report documents an evaluation of the thermal characteristics of the MED3000 composition under simulated clinical conditions of use: The investigation measured the spatio-temporal temperature changes on an ex vivo penis-like tissue surface due to application of the MED3000 composition.

Testing was conducted using samples of the final, finished MED3000 composition, manufactured to the same specification, at the same production scale and packed into the same primary packaging system as proposed for marketing in the United States.

This study was conducted to further demonstrate the thermal characteristics of the MED3000 composition (i.e. creating a rapid, localized cooling effect followed by a recovering warming effect) and provide the FDA with an understanding of factors which may influence safety and effectiveness, satisfying the requirements of 21 CFR 860.7.

Test Performed

The MED3000 composition was applied to the surface of an ex vivo porcine muscle tissue block under simulated conditions of use, and the temperature-time history measured via resistance thermometry.

The composition was applied to an area of tissue representative of the clinical indication site. Before application of the composition, the surface of the tissue block was maintained at a temperature relevant to the composition indication for use by submersion of the block in a 37° C. water bath, leaving the top surface exposed to the room air for application of the composition.

The tissue surface temperature-time information was measured using three (3) probe thermometers; one placed at the center of the composition application area on the tissue surface, and two placed at opposite edges of the application area (each equidistant from the centre probe), to profile the complete spatio-temporal temperature distribution on the tissue.

Objective of the Test

The aim of the study was to further demonstrate the thermal characteristics of the MED3000 composition (medical device) (i.e. that it creates a rapid cooling effect followed by a recovery warming effect) under ex vivo simulated conditions of use.

The purpose of the study was to perform an ex vivo temperature profiling assessment to investigate the spatio-temporal temperature changes on the skin surface following application of MED3000 composition when a defined (300 mg) and maximum (800 mg) dose were applied to an ex vivo tissue with thermo-physiological properties comparable to the clinical indication site.

A dose of MED3000 composition is a pea-sized amount of gel (weighing approximately 300 mg). The primary packaging of the gel is a single dose aluminium tube, therefore a portion of the gel contained in the tube shoulders cannot be evacuated by squeezing the body of the tube. The tubes are filled to a nominal weight of 800 mg to ensure delivery of at least 300 mg gel. Accounting for the unlikely scenario that a user is able to extract the complete contents of a tube, the thermal effects of both 300 mg and 800 mg dosage amounts have been evaluated.

Description of Test Methods

MED3000 Gel

The study evaluated the MED3000 composition. The formulation of the MED3000 composition is shown in Table 1.

TABLE 1

MED3000 gel formulation

| Ingredient | Material Grade | MED3000 Gel % w/w |
|---|---|---|
| Alcohol 96% v/v | USP | 35.19 |
| Purified Water | USP | 33.71 |
| Glycerin | USP | 24.00 |
| Propylene Glycol | USP | 6.00 |
| Carbomer Interpolymer Type A (Carbopol Ultrez 10) | NF | 1.00 |
| Potassium Hydroxide | NF | 0.10 |
| Total | | 100.00 |

One batch of the MED3000 composition was tested. Batch details are shown in Table 2.

TABLE 2

Details of MED3000 gel batch tested

| Material | Batch Number | Date of Manufacture |
|---|---|---|
| MED3000 | 3SS | February 2023 |

The thermal characteristics of two different doses of the test article were evaluated:

300 mg—The intended clinical dose.

800 mg—The worst-case clinical dose, accounting for the unlikely scenario in which a user is able to extract the entire contents of a single tube.

Testing of each dose amount was performed in triplicate.

Ex Vivo Tissue

MED3000 gel was applied to the skin surface of an ex vivo tissue with thermo-physiological properties comparable to the clinical application site: A porcine muscle tissue block.

The surface of the block was maintained at a steady state temperature of approximately 32-34° C., a range representative of that reported in the literature for the clinical indication site, the glans penis (Merla A, Romani G, Tangherlini A, Di Romualado M, Proietti M, Rosato E, Aversa A and Salsano F. Penile Cutaneous Temperature in Systemic Sclerosis: A Thermal Imaging Study. International Journal of Immunopathology and Pharmacology. 2007, Vol 20, No 1, 139-144; which is hereby incorporated by reference in its entirety).

An area for composition application measuring 3.5 cm (L)×3.5 cm (W) was marked on the tissue surface representative of the area of the intended clinical site of application.

The tissue block measured 8 cm (L)×8 cm (W)×6 cm (D). A continuous tissue margin of not less than 2 cm in all three dimensions around the area of composition application was present to ensure boundary conditions did not influence the measurements taken at the application site.

Water Bath

The ex vivo tissue block was submerged in a 14-litre capacity digital water bath with internal dimensions of 353×325×(H) 200 mm set to a temperature of 37° C. (±0.1° C. accuracy). Uniformity of temperature throughout the circulating water was confirmed using a calibrated probe at five points in the bath (center and 4 corners).

Temperature Probe Thermometers

The surface temperature of the skin was measured throughout the test using three (3) calibrated class A Pt100 temperature probe thermometers with a resolution of 0.1° C. (over a range of −199.9° C. to +199.9° C.).

Probes were sited at the centre of the composition application area (1 probe) and at opposite edges of the application area (2 probes).

A fourth calibrated Pt100 probe was inserted into the centre of the muscle block to measure the core temperature of the tissue.

The temperature probes were calibrated at 0° C., 10° C. and 50° C. prior to starting the study.

The probes have a response time of approximately 7.5 seconds, this is determined sufficient to accurately measure the temperature changes on a tissue occurring over several minutes. Independent measurement of three discrete points on the tissue surface (accurate to 0.1° C. under the study conditions) is preferred as it allows the measurement of the temperature distribution with sufficient spatial and temporal resolution to characterise the thermal effects of the composition over a larger area of the tissue surface.

Methodology

1. The skin surface of the porcine tissue block was marked to identify an area of approximately 12 cm$^2$ for gel application to represent the area of the intended clinical application site—the glans penis.
2. The tissue block was submerged—leaving only the top (skin) surface exposed to air—in a water bath maintained at a temperature of 37° C.
3. Three temperature probes were placed on the surface of the skin. One (1) in the centre of the composition application area, and two (2) diagonally opposite at the edge of the marked area on the surface of the skin.
4. The tissue block was allowed to equilibrate for approximately 2.5 hours (initial equilibration) in the covered water bath until a steady state temperature of between approximately 32-34° C. was measured by the temperature probes at three points on the skin surface, and a core tissue temperature of 37° C. was achieved (measured by a fourth probe inserted into the tissue block). In some instances, occlusion of the water bath may be necessary to achieve an initial skin surface temperature in the required range.
5. The water bath cover was removed.
6. 300 mg of MED3000 gel was applied to the 12 cm$^2$ area marked on the tissue block. The gel was spread over the marked area containing the probes by finger.
7. The real-time readings displayed on the temperature probes prior to application of the gel and throughout the 11-minute experimental duration were recorded on video.
8. The water bath was left uncovered following composition application to allow evaporation of the formulation, as would be the case in the clinical setting. After 6 minutes, when the effects of evaporation were judged to be complete, the water bath was recovered to support maintenance of the skin surface temperature (as would be the case in clinical use when in vivo blood flow would provide support to maintain skin temperature).
9. All gel residue was removed from the tissue block.
10. Steps 3 to 9 were repeated for two further replicates of the 300 mg dose, and three replicates of an 800 mg dose.
11. Steps 3-5, 7 and 8 were repeated in triplicate for the experimental control (n=3) of untreated tissue.
12. Video recordings of all experimental runs (replicates) were reviewed and the data documented at the following time-points (minutes 0.17, 0.33, 0.5, 0.67, 0.83, 1.0, 1.25, 1.5, 1.75, 2.0, 2.5, 3.0, 3.5, 4.0, 5.0, 6.0, 7.0, 8.0, 9.0, 10.0, 11.0)

Test Results

The change in temperature on the tissue block surface was recorded using 3 class A Pt100 probe thermometers over an 11-minute experimental duration (by which time, the starting temperature of 32° C. was reached) post application of the MED3000 composition to investigate the temperature profile of the formulation effect on the tissue.

Figure 3:
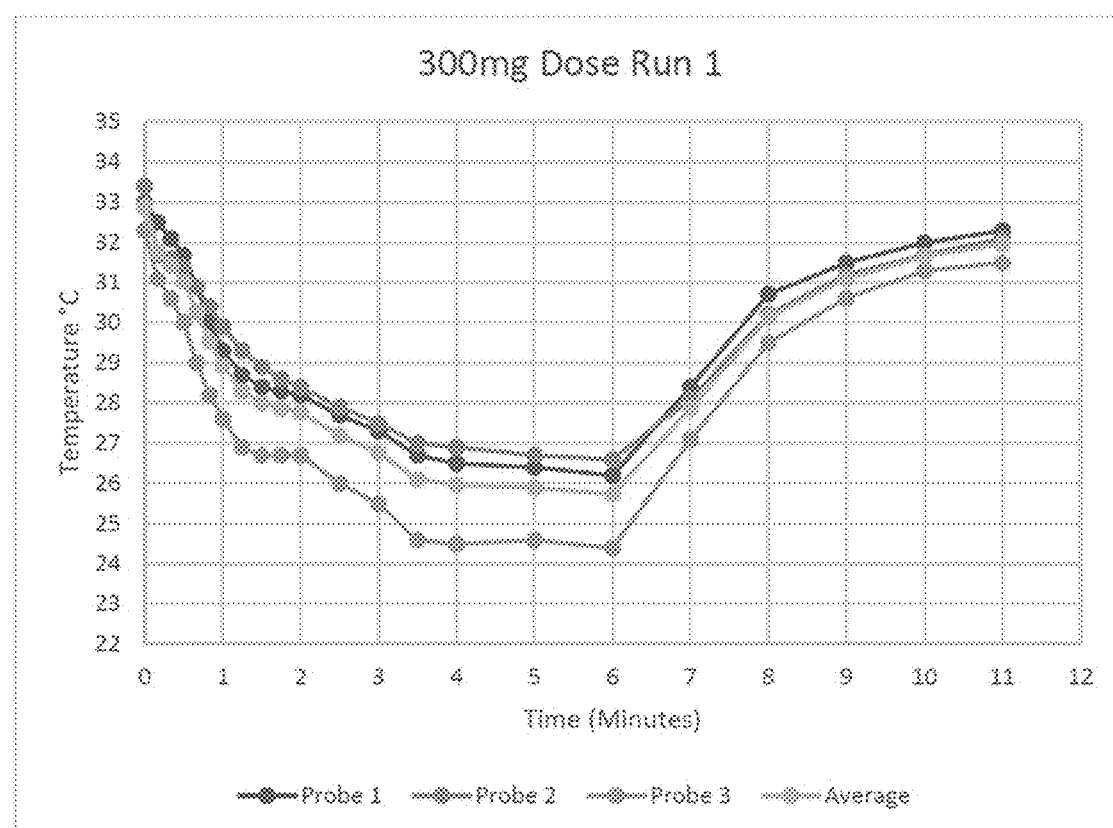
FIG. 3 shows the temperature (° C.) at the tissue surface recorded by three probe thermometers over an 11 minute experimental duration (with 10 second intervals during the first minute, followed by 15 s intervals in the second minute, and 30 s second intervals in the third and fourth minutes) after application of 300 mg MED3000 composition. Replicate #1.
Figure 4:
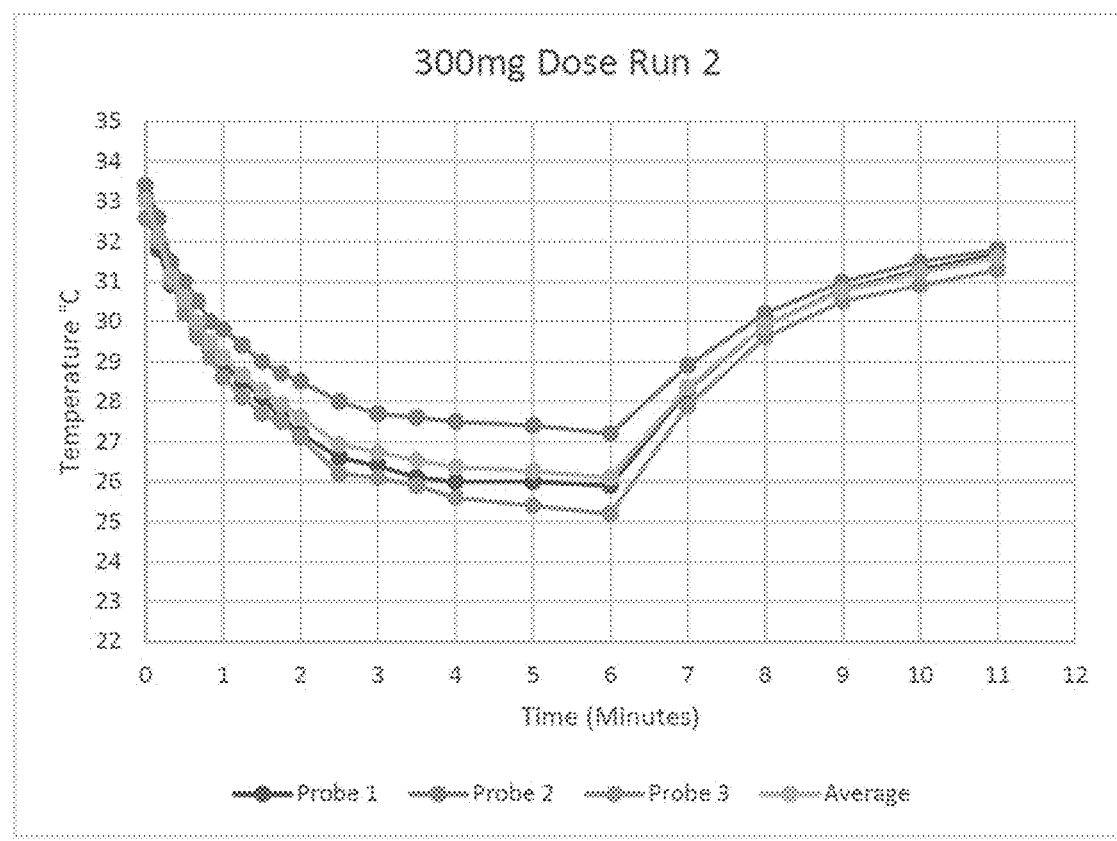
FIG. 4 shows the temperature (° C.) at the tissue surface recorded by three probe thermometers over an 11 minute experimental duration (with 10 second intervals during the first minute, followed by 15 s intervals in the second minute, and 30 s second intervals in the third and fourth minutes) after application of 300 mg MED3000 composition. Replicate #2.
Figure 5:
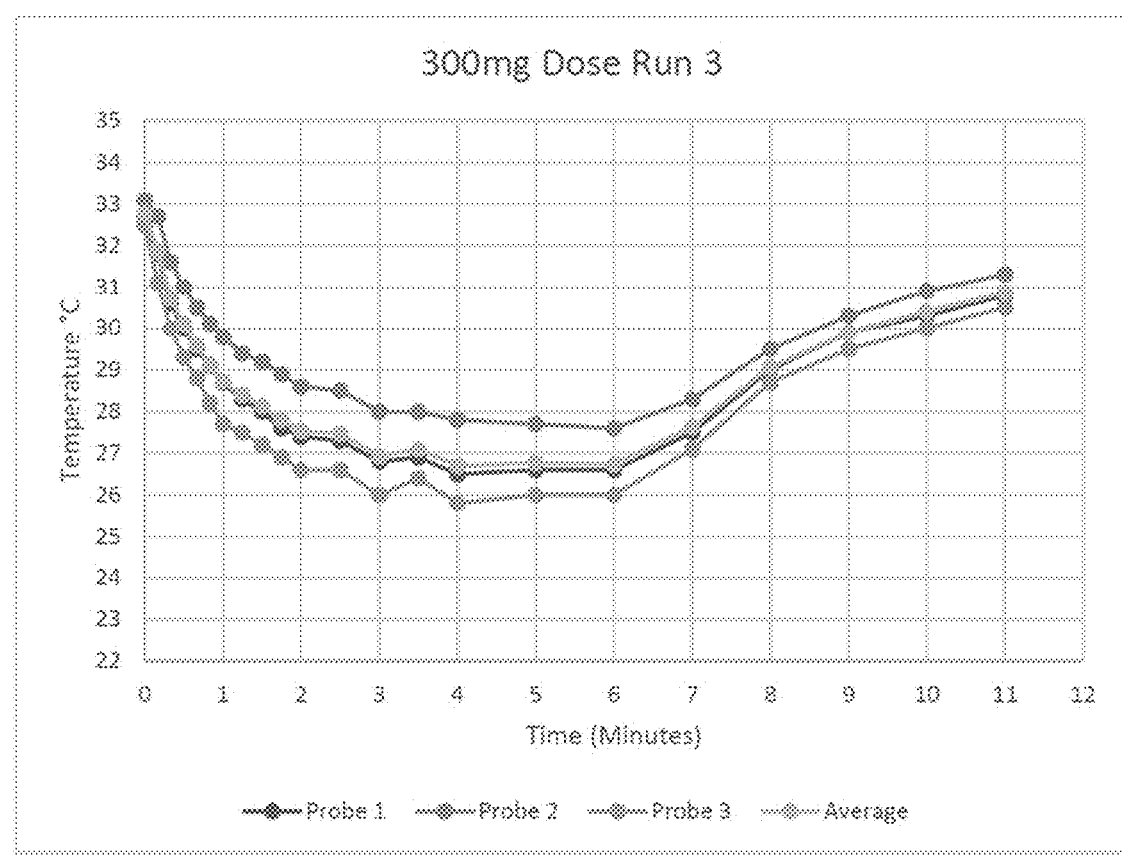
FIG. 5 shows the temperature (C) at the tissue surface recorded by three probe thermometers over an 11 minute experimental duration (with 10 second intervals during the first minute, followed by 15 s intervals in the second minute, and 30 s second intervals in the third and fourth minutes) after application of 300 mg MED3000 composition. Replicate #3.

The temperatures (° C.) recorded for the 300 mg dose of MED3000 composition (n=3) over the full experimental duration (including 10 second intervals within the first minute, followed by 15 second intervals in the second minute and 30 second intervals in the third and fourth minutes) are shown in Tables 3, 4, 5 and FIGS. 3, 4, 5.

Figure 6:
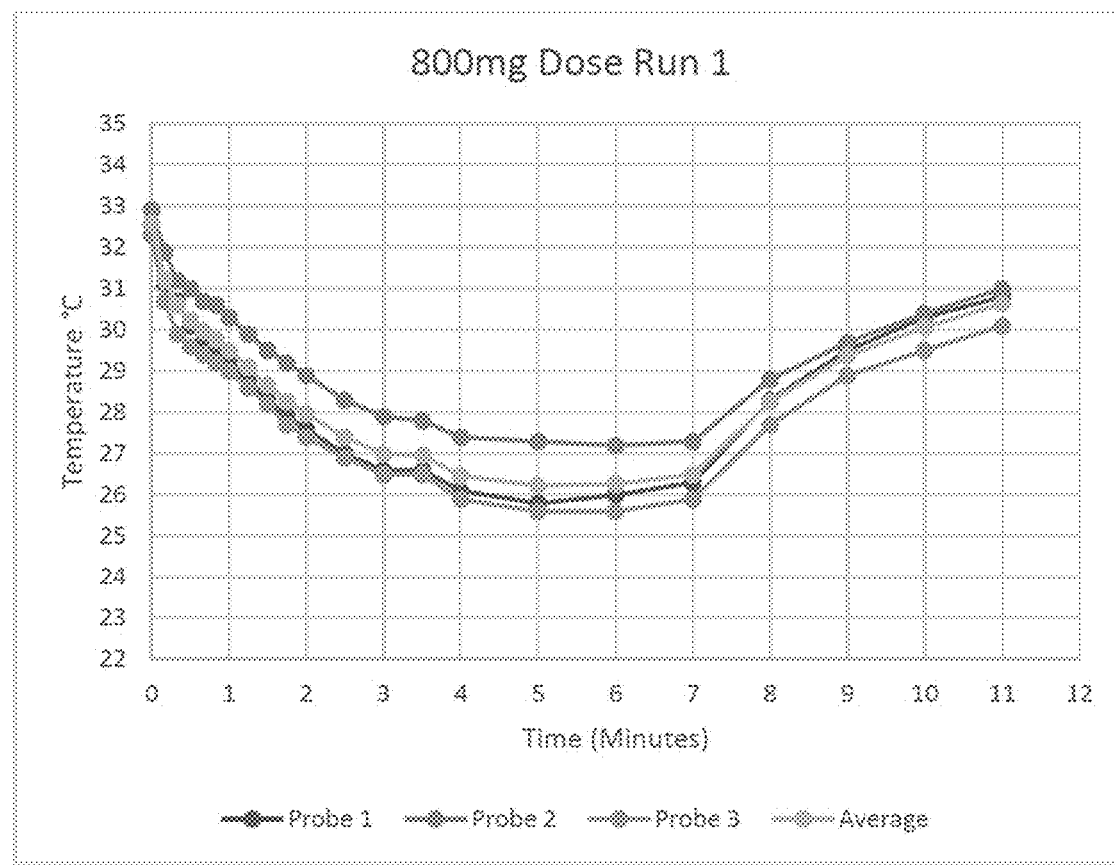
FIG. 6 shows the temperature (° C.) at the tissue surface recorded by three probe thermometers over an 11 minute experimental duration (with 10 second intervals during the first minute, followed by 15 s intervals in the second minute, and 30 s second intervals in the third and fourth minutes) after application of 800 mg MED3000 composition. Replicate #1.
Figure 7:
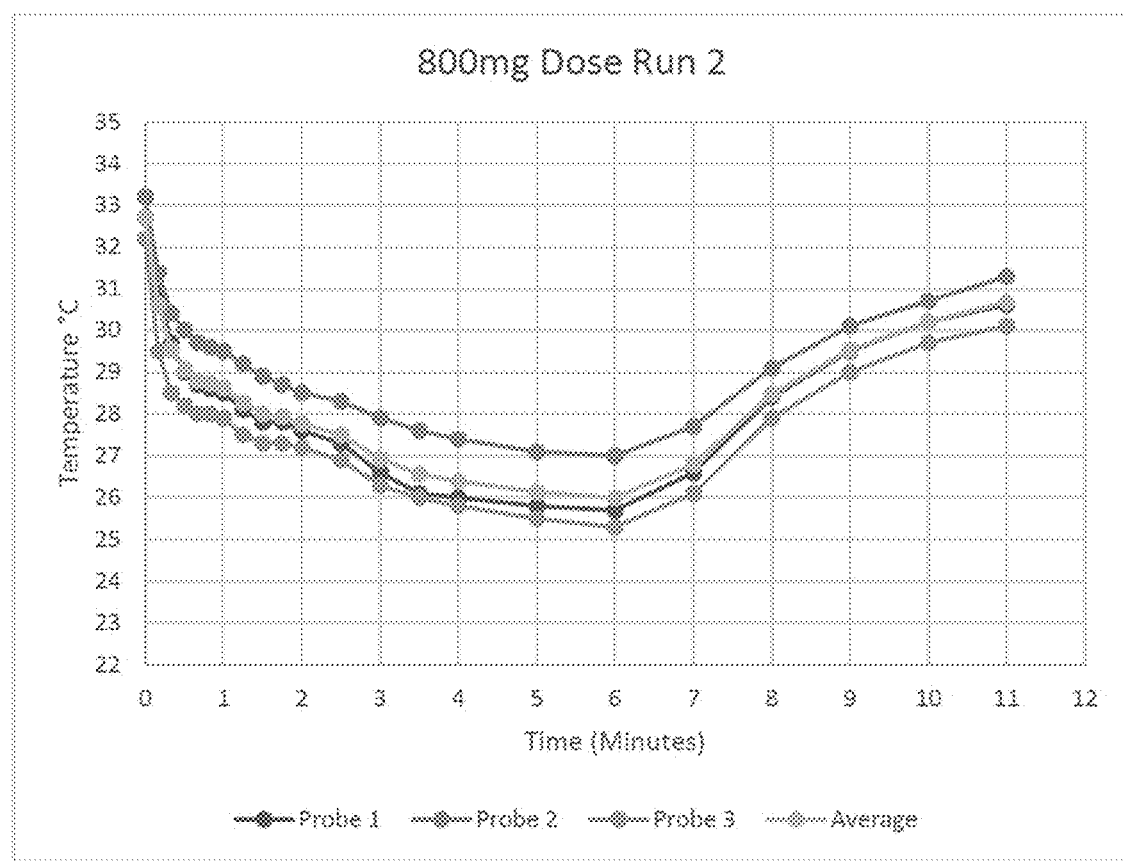
FIG. 7 shows the temperature (° C.) at the tissue surface recorded by three probe thermometers over an 11 minute experimental duration (with 10 second intervals during the first minute, followed by 15 s intervals in the second minute, and 30 s second intervals in the third and fourth minutes) after application of 800 mg MED3000 composition. Replicate #2.
Figure 8:
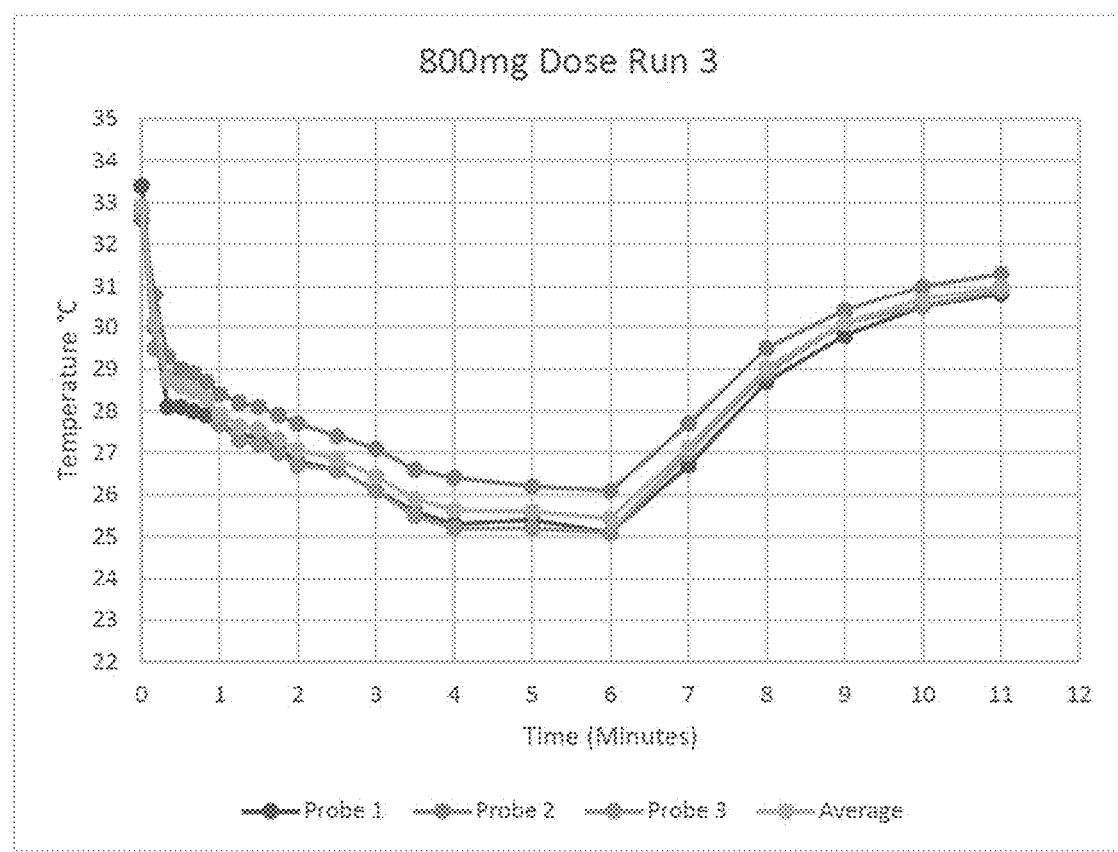
FIG. 8 shows the temperature (C) at the tissue surface recorded by three probe thermometers over an 11 minute experimental duration (with 10 second intervals during the first minute, followed by 15 s intervals in the second minute, and 30 s second intervals in the third and fourth minutes) after application of 800 mg MED3000 composition. Replicate #3.

The temperatures (° C.) for the 800 mg dose of MED3000 composition (n=3) are shown in Tables 6, 7 and 8 and FIGS. 6, 7 and 8.

Figure 9:
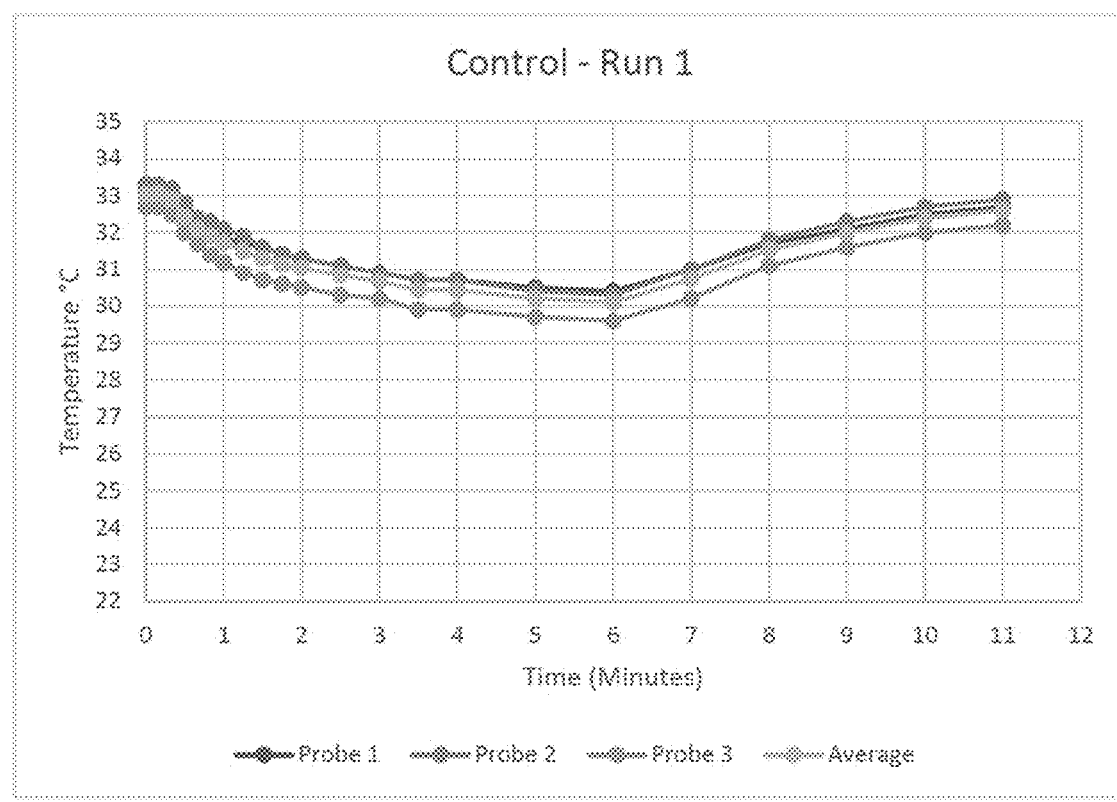
FIG. 9 shows the temperature (° C.) at the untreated (control) tissue surface recorded by three probe thermometers over an 11 minute experimental duration (with 10 second intervals during the first minute, followed by 15 s intervals in the second minute, and 30 s second intervals in the third and fourth minutes). Replicate #1.
Figure 10:
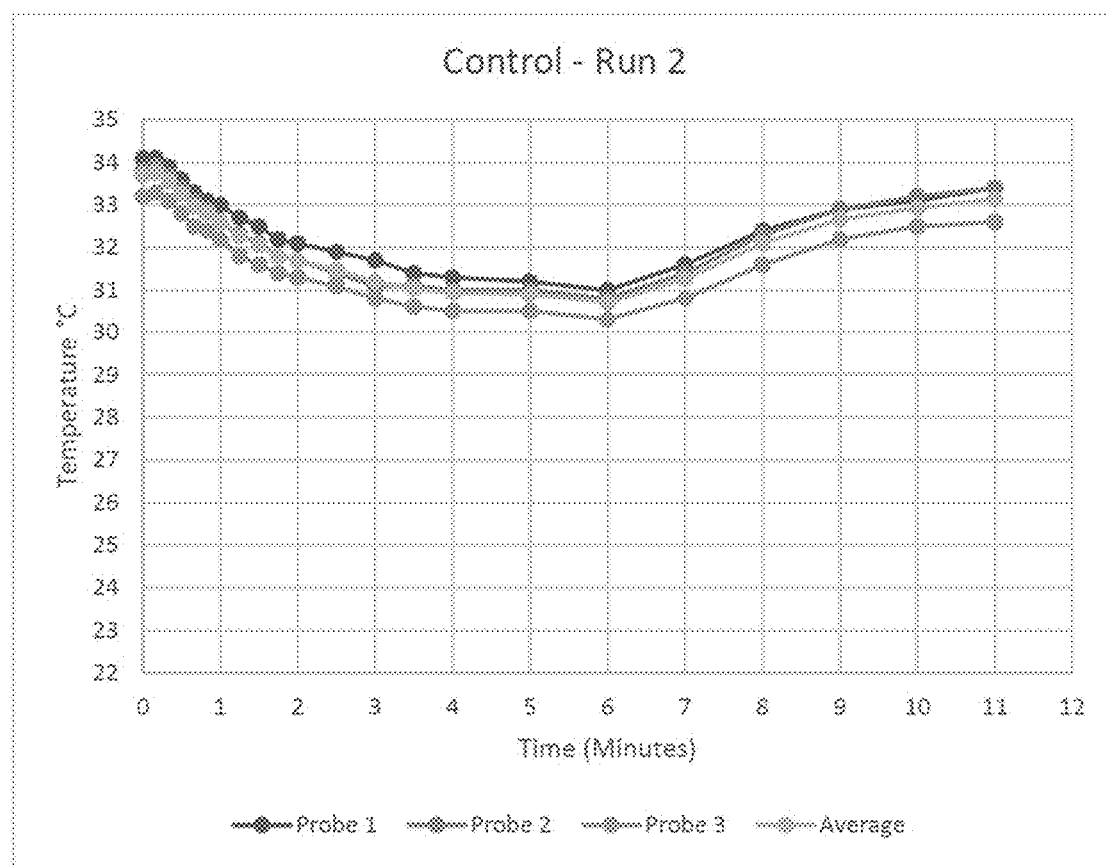
FIG. 10 shows the temperature (° C.) at the untreated (control) tissue surface recorded by three probe thermometers over an 11 minute experimental duration (with 10 second intervals during the first minute, followed by 15 s intervals in the second minute, and 30 s second intervals in the third and fourth minutes). Replicate #2.
Figure 11:
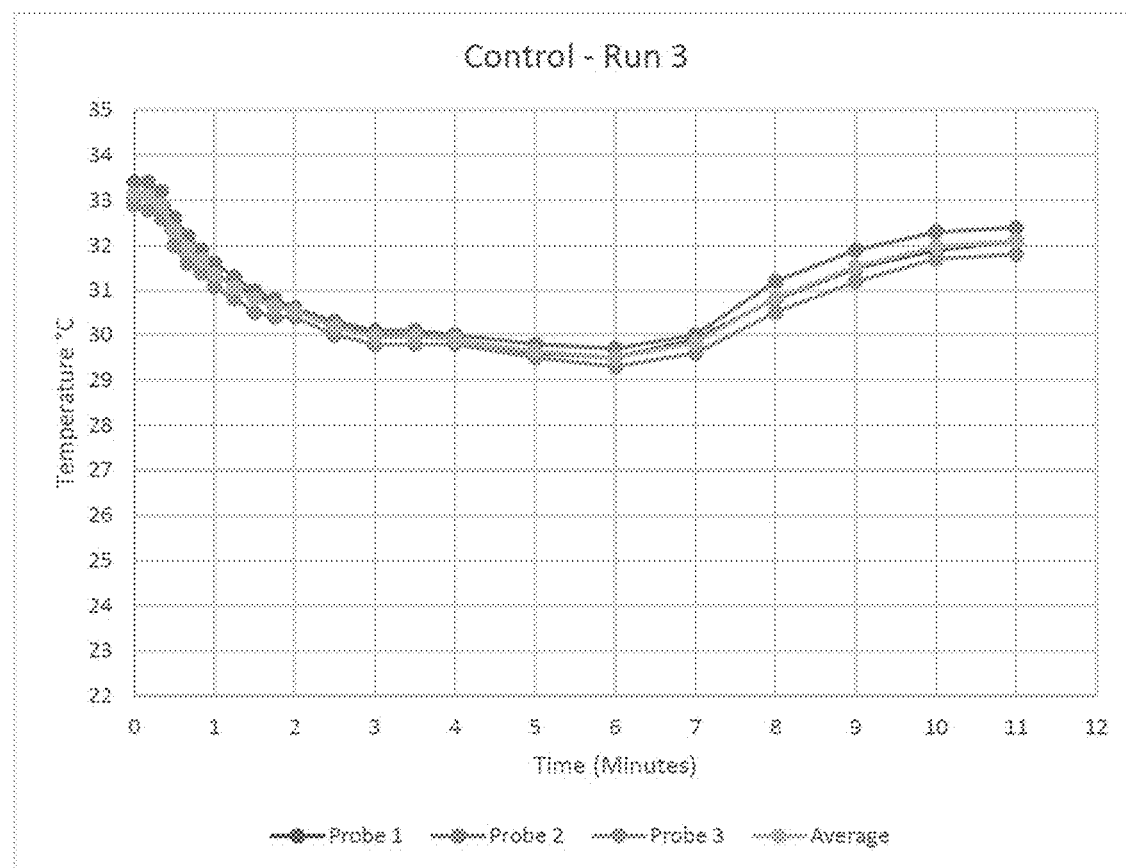
FIG. 11 shows the temperature (° C.) at the untreated (control) tissue surface recorded by three probe thermometers over an 11 minute experimental duration (with 10 second intervals during the first minute, followed by 15 s intervals in the second minute, and 30 s second intervals in the third and fourth minutes). Replicate #3.

The temperatures (° C.) for the untreated control tissues (n=3) are shown in Tables 9, 10 and 11 and FIGS. 9, 10 and 11.

In addition, the following datasets are tabulated to enable comparison:

The average temperatures (° C.) of the tissue block surface (expressed as the mean of the three probe measurements) for the 300 mg and 800 mg dose amounts over the 11-minute experimental duration are shown in Table 12.

The average temperatures (° C.) of the tissue block surface (expressed as the mean of three replicates) for the 300 mg, 800 mg and control runs over the 11-minute experimental duration are shown in Table 13.

TABLE 3

Temperatures (° C.) of the tissue surface recorded by three probe thermometers over an 11 minute experimental duration (with 10 second intervals during the first minute, followed by 15 s intervals in the second minute and 30 s intervals in the third and fourth minutes) after application of 300 mg of MED3000 composition to the tissue. Data are shown for replicate #1.

| Time | Temperature (° C.) MED3000 (BN: 3SS) - 300 mg Dose | | | |
|---|---|---|---|---|
| (Minutes) | Probe 1 | Probe 2 | Probe 3 | Average |
| 0.00 | 33.0 | 33.4 | 32.3 | 32.9 |
| 0.17 | 32.5 | 31.7 | 31.1 | 31.8 |
| 0.33 | 32.1 | 31.6 | 30.6 | 31.4 |
| 0.50 | 31.7 | 31.4 | 30.0 | 31.0 |
| 0.67 | 30.9 | 30.9 | 29.0 | 30.3 |
| 0.83 | 30.0 | 30.4 | 28.2 | 29.5 |
| 1.00 | 29.3 | 29.9 | 27.6 | 28.9 |
| 1.25 | 28.7 | 29.3 | 26.9 | 28.3 |
| 1.50 | 28.4 | 28.9 | 26.7 | 28.0 |
| 1.75 | 28.3 | 28.6 | 26.7 | 27.9 |
| 2.00 | 28.2 | 28.4 | 26.7 | 27.8 |
| 2.50 | 27.7 | 27.9 | 26.0 | 27.2 |
| 3.00 | 27.3 | 27.5 | 25.5 | 26.8 |
| 3.50 | 26.7 | 27.0 | 24.6 | 26.1 |
| 4.00 | 26.5 | 26.9 | 24.5 | 26.0 |
| 5.00 | 26.4 | 26.7 | 24.6 | 25.9 |
| 6.00 | 26.2 | 26.6 | 24.4 | 25.7 |
| 7.00 | 28.4 | 28.1 | 27.1 | 27.9 |
| 8.00 | 30.7 | 30.2 | 29.5 | 30.1 |
| 9.00 | 31.5 | 31.2 | 30.6 | 31.1 |
| 10.00 | 32.0 | 31.7 | 31.3 | 31.7 |
| 11.00 | 32.3 | 32.1 | 31.5 | 32.0 |

TABLE 4

Temperatures (° C.) of the tissue surface recorded by three probe thermometers over an 11 minute experimental duration (with 10 second intervals during the first minute, followed by 15 s intervals in the second minute and 30 s intervals in the third and fourth minutes) after application of 300 mg of MED3000 composition to the tissue. Data are shown for replicate #2.

| Time | Temperature (° C.) MED3000 (BN: 3SS) - 300 mg Dose | | | |
|---|---|---|---|---|
| (Minutes) | Probe 1 | Probe 2 | Probe 3 | Average |
| 0.00 | 33.1 | 33.4 | 32.6 | 33.0 |
| 0.17 | 31.8 | 32.6 | 32.0 | 32.1 |
| 0.33 | 30.9 | 31.5 | 31.0 | 31.1 |
| 0.50 | 30.5 | 31.0 | 30.2 | 30.6 |
| 0.67 | 29.8 | 30.5 | 29.6 | 30.0 |
| 0.83 | 29.3 | 30.0 | 29.1 | 29.5 |
| 1.00 | 28.9 | 29.8 | 28.6 | 29.1 |
| 1.25 | 28.5 | 29.4 | 28.1 | 28.7 |
| 1.50 | 28.1 | 29.0 | 27.7 | 28.3 |
| 1.75 | 27.6 | 28.7 | 27.5 | 27.9 |
| 2.00 | 27.2 | 28.5 | 27.1 | 27.6 |
| 2.50 | 26.6 | 28.0 | 26.2 | 26.9 |
| 3.00 | 26.4 | 27.7 | 26.1 | 26.7 |

TABLE 4-continued

Temperatures (° C.) of the tissue surface recorded by three probe thermometers over an 11 minute experimental duration (with 10 second intervals during the first minute, followed by 15 s intervals in the second minute and 30 s intervals in the third and fourth minutes) after application of 300 mg of MED3000 composition to the tissue. Data are shown for replicate #2.

| Time | Temperature (° C.) MED3000 (BN: 3SS) - 300 mg Dose | | | |
|---|---|---|---|---|
| (Minutes) | Probe 1 | Probe 2 | Probe 3 | Average |
| 3.50 | 26.1 | 27.6 | 25.9 | 26.5 |
| 4.00 | 26.0 | 27.5 | 25.6 | 26.4 |
| 5.00 | 26.0 | 27.4 | 25.4 | 26.3 |
| 6.00 | 25.9 | 27.2 | 25.2 | 26.1 |
| 7.00 | 28.3 | 28.9 | 27.9 | 28.4 |
| 8.00 | 29.9 | 30.2 | 29.6 | 29.9 |
| 9.00 | 30.8 | 31.0 | 30.5 | 30.8 |
| 10.00 | 31.3 | 31.5 | 30.9 | 31.2 |
| 11.00 | 31.7 | 31.8 | 31.3 | 31.6 |

TABLE 5

Temperatures (° C.) of the tissue surface recorded by three probe thermometers over an 11 minute experimental duration (with 10 second intervals during the first minute, followed by 15 s intervals in the second minute and 30 s intervals in the third and fourth minutes) after application of 300 mg of MED3000 composition to the tissue. Data are shown for replicate #3.

| Time | Temperature (° C.) MED3000 (BN: 3SS) - 300 mg Dose | | | |
|---|---|---|---|---|
| (Minutes) | Probe 1 | Probe 2 | Probe 3 | Average |
| 0.00 | 32.7 | 33.1 | 32.5 | 32.8 |
| 0.17 | 31.8 | 32.7 | 31.1 | 31.9 |
| 0.33 | 30.6 | 31.6 | 30.0 | 30.7 |
| 0.50 | 30.0 | 31.0 | 29.3 | 30.1 |
| 0.67 | 29.5 | 30.5 | 28.8 | 29.6 |
| 0.83 | 29.1 | 30.1 | 28.2 | 29.1 |
| 1.00 | 28.7 | 29.8 | 27.7 | 28.7 |
| 1.25 | 28.3 | 29.4 | 27.5 | 28.4 |
| 1.50 | 28.0 | 29.2 | 27.2 | 28.1 |
| 1.75 | 27.6 | 28.9 | 26.9 | 27.8 |
| 2.00 | 27.4 | 28.6 | 26.6 | 27.5 |
| 2.50 | 27.3 | 28.5 | 26.6 | 27.5 |
| 3.00 | 26.8 | 28.0 | 26.0 | 26.9 |
| 3.50 | 26.9 | 28.0 | 26.4 | 27.1 |
| 4.00 | 26.5 | 27.8 | 25.8 | 26.7 |
| 5.00 | 26.6 | 27.7 | 26.0 | 26.8 |
| 6.00 | 26.6 | 27.6 | 26.0 | 26.7 |
| 7.00 | 27.5 | 28.3 | 27.1 | 27.6 |
| 8.00 | 29.0 | 29.5 | 28.7 | 29.1 |
| 9.00 | 29.9 | 30.3 | 29.5 | 29.9 |
| 10.00 | 30.3 | 30.9 | 30.0 | 30.4 |
| 11.00 | 30.8 | 31.3 | 30.5 | 30.9 |

TABLE 6

Temperatures (° C.) of the tissue surface recorded by three probe thermometers over an 11 minute experimental duration (with 10 second intervals during the first minute, followed by 15 s intervals in the second minute and 30 s intervals in the third and fourth minutes) after application of 800 mg of MED3000 composition to the tissue. Data are shown for replicate #1.

| Time | Temperature (° C.) MED3000 (BN: 3SS) - 800 mg Dose | | | |
|---|---|---|---|---|
| (Minutes) | Probe 1 | Probe 2 | Probe 3 | Average |
| 0.00 | 32.6 | 32.9 | 32.3 | 32.6 |
| 0.17 | 31.1 | 31.9 | 30.7 | 31.2 |
| 0.33 | 30.7 | 31.2 | 29.9 | 30.6 |
| 0.50 | 30.1 | 31.0 | 29.6 | 30.2 |
| 0.67 | 29.8 | 30.7 | 29.4 | 30.0 |
| 0.83 | 29.5 | 30.6 | 29.2 | 29.8 |
| 1.00 | 29.2 | 30.3 | 29.0 | 29.5 |
| 1.25 | 28.8 | 29.9 | 28.6 | 29.1 |
| 1.50 | 28.3 | 29.5 | 28.2 | 28.7 |
| 1.75 | 27.9 | 29.2 | 27.7 | 28.3 |
| 2.00 | 27.6 | 28.9 | 27.4 | 28.0 |
| 2.50 | 27.0 | 28.3 | 26.9 | 27.4 |
| 3.00 | 26.6 | 27.9 | 26.5 | 27.0 |
| 3.50 | 26.6 | 27.8 | 26.5 | 27.0 |
| 4.00 | 26.1 | 27.4 | 25.9 | 26.5 |
| 5.00 | 25.8 | 27.3 | 25.6 | 26.2 |
| 6.00 | 26.0 | 27.2 | 25.6 | 26.3 |
| 7.00 | 26.3 | 27.3 | 25.9 | 26.5 |
| 8.00 | 28.3 | 28.8 | 27.7 | 28.3 |
| 9.00 | 29.5 | 29.7 | 28.9 | 29.4 |
| 10.00 | 30.3 | 30.4 | 29.5 | 30.1 |
| 11.00 | 30.8 | 31.0 | 30.1 | 30.6 |

TABLE 7

Temperatures (° C.) of the tissue surface recorded by three probe thermometers over an 11 minute experimental duration (with 10 second intervals during the first minute, followed by 15 s intervals in the second minute and 30 s intervals in the third and fourth minutes) after application of 800 mg of MED3000 composition to the tissue. Data are shown for replicate #2.

| Time | Temperature (° C.) MED3000 (BN: 3SS) - 800 mg Dose | | | |
|---|---|---|---|---|
| (Minutes) | Probe 1 | Probe 2 | Probe 3 | Average |
| 0.00 | 32.7 | 33.2 | 32.2 | 32.7 |
| 0.17 | 30.9 | 31.4 | 29.5 | 30.6 |
| 0.33 | 29.7 | 30.4 | 28.5 | 29.5 |
| 0.50 | 29.0 | 30.0 | 28.2 | 29.1 |
| 0.67 | 28.7 | 29.7 | 28.0 | 28.8 |
| 0.83 | 28.6 | 29.6 | 28.0 | 28.7 |
| 1.00 | 28.5 | 29.5 | 27.9 | 28.6 |
| 1.25 | 28.1 | 29.2 | 27.5 | 28.3 |
| 1.50 | 27.8 | 28.9 | 27.3 | 28.0 |
| 1.75 | 27.8 | 28.7 | 27.3 | 27.9 |
| 2.00 | 27.6 | 28.5 | 27.2 | 27.8 |
| 2.50 | 27.3 | 28.3 | 26.9 | 27.5 |
| 3.00 | 26.6 | 27.9 | 26.3 | 26.9 |
| 3.50 | 26.1 | 27.6 | 26.0 | 26.6 |
| 4.00 | 26.0 | 27.4 | 25.8 | 26.4 |
| 5.00 | 25.8 | 27.1 | 25.5 | 26.1 |
| 6.00 | 25.7 | 27.0 | 25.3 | 26.0 |
| 7.00 | 26.6 | 27.7 | 26.1 | 26.8 |
| 8.00 | 28.4 | 29.1 | 27.9 | 28.5 |
| 9.00 | 29.5 | 30.1 | 29.0 | 29.5 |
| 10.00 | 30.2 | 30.7 | 29.7 | 30.2 |
| 11.00 | 30.6 | 31.3 | 30.1 | 30.7 |

TABLE 8

Temperatures (° C.) of the tissue surface recorded by three probe thermometers over an 11 minute experimental duration (with 10 second intervals during the first minute, followed by 15 s intervals in the second minute and 30 s intervals in the third and fourth minutes) after application of 800 mg of MED3000 composition to the tissue. Data are shown for replicate #3.

| Time | Temperature (° C.) MED3000 (BN: 3SS) - 800 mg Dose | | | |
|---|---|---|---|---|
| (Minutes) | Probe 1 | Probe 2 | Probe 3 | Average |
| 0.00 | 33.4 | 32.6 | 32.8 | 32.9 |
| 0.17 | 30.0 | 30.8 | 29.5 | 30.1 |
| 0.33 | 28.1 | 29.3 | 28.8 | 28.7 |
| 0.50 | 28.1 | 29.0 | 28.7 | 28.6 |
| 0.67 | 28.0 | 28.9 | 28.5 | 28.5 |
| 0.83 | 27.9 | 28.7 | 28.3 | 28.3 |
| 1.00 | 27.7 | 28.4 | 27.7 | 27.9 |
| 1.25 | 27.4 | 28.2 | 27.3 | 27.6 |
| 1.50 | 27.4 | 28.1 | 27.2 | 27.6 |
| 1.75 | 27.1 | 27.9 | 27.0 | 27.3 |
| 2.00 | 26.8 | 27.7 | 26.7 | 27.1 |
| 2.50 | 26.6 | 27.4 | 26.6 | 26.9 |
| 3.00 | 26.1 | 27.1 | 26.1 | 26.4 |
| 3.50 | 25.6 | 26.6 | 25.5 | 25.9 |
| 4.00 | 25.3 | 26.4 | 25.2 | 25.6 |
| 5.00 | 25.4 | 26.2 | 25.2 | 25.6 |
| 6.00 | 25.1 | 26.1 | 25.1 | 25.4 |
| 7.00 | 26.7 | 27.7 | 27.0 | 27.1 |
| 8.00 | 28.7 | 29.5 | 28.9 | 29.0 |
| 9.00 | 29.8 | 30.4 | 30.1 | 30.1 |
| 10.00 | 30.5 | 31.0 | 30.5 | 30.7 |
| 11.00 | 30.8 | 31.3 | 30.9 | 31.0 |

TABLE 9

Temperatures (° C.) of the untreated (control) tissue surface recorded by three probe thermometers over an 11 minute experimental duration (with 10 second intervals during the first minute, followed by 15 s intervals in the second minute and 30 s intervals in the third and fourth minutes). Data are shown for replicate #1.

| Time | Temperature (° C.) Control - Replicate #1 | | | |
|---|---|---|---|---|
| (Minutes) | Probe 1 | Probe 2 | Probe 3 | Average |
| 0.00 | 33.1 | 33.3 | 32.7 | 33.0 |
| 0.17 | 33.2 | 33.3 | 32.7 | 33.1 |
| 0.33 | 33.0 | 33.2 | 32.5 | 32.9 |
| 0.50 | 32.5 | 32.8 | 32.0 | 32.4 |
| 0.67 | 32.2 | 32.4 | 31.7 | 32.1 |
| 0.83 | 32.0 | 32.3 | 31.4 | 31.9 |
| 1.00 | 31.9 | 32.1 | 31.2 | 31.7 |
| 1.25 | 31.7 | 31.9 | 30.9 | 31.5 |
| 1.50 | 31.6 | 31.6 | 30.7 | 31.3 |
| 1.75 | 31.4 | 31.4 | 30.6 | 31.1 |
| 2.00 | 31.3 | 31.3 | 30.5 | 31.0 |
| 2.50 | 31.1 | 31.1 | 30.3 | 30.8 |
| 3.00 | 30.9 | 30.9 | 30.2 | 30.7 |
| 3.50 | 30.7 | 30.7 | 29.9 | 30.4 |
| 4.00 | 30.7 | 30.7 | 29.9 | 30.4 |
| 5.00 | 30.5 | 30.4 | 29.7 | 30.2 |
| 6.00 | 30.4 | 30.3 | 29.6 | 30.1 |
| 7.00 | 31.0 | 31.0 | 30.2 | 30.7 |
| 8.00 | 31.7 | 31.8 | 31.1 | 31.5 |
| 9.00 | 32.1 | 32.3 | 31.6 | 32.0 |
| 10.00 | 32.5 | 32.7 | 32.0 | 32.4 |
| 11.00 | 32.7 | 32.9 | 32.2 | 32.6 |

TABLE 10

Temperatures (° C.) of the untreated (control) tissue surface recorded by three probe thermometers over an 11 minute experimental duration (with 10 second intervals during the first minute, followed by 15 s intervals in the second minute and 30 s intervals in the third and fourth minutes). Data are shown for replicate #2.

| Time | Temperature (° C.) Control - Replicate #2 | | | |
|---|---|---|---|---|
| (Minutes) | Probe 1 | Probe 2 | Probe 3 | Average |
| 0.00 | 34.1 | 33.8 | 33.2 | 33.7 |
| 0.17 | 34.1 | 33.9 | 33.3 | 33.8 |
| 0.33 | 33.9 | 33.7 | 33.1 | 33.6 |
| 0.50 | 33.6 | 33.4 | 32.8 | 33.3 |
| 0.67 | 33.3 | 33.1 | 32.5 | 33.0 |
| 0.83 | 33.1 | 32.9 | 32.4 | 32.8 |
| 1.00 | 33.0 | 32.6 | 32.2 | 32.6 |
| 1.25 | 32.7 | 32.3 | 31.8 | 32.3 |
| 1.50 | 32.5 | 32.1 | 31.6 | 32.1 |
| 1.75 | 32.2 | 31.8 | 31.4 | 31.8 |
| 2.00 | 32.1 | 31.7 | 31.3 | 31.7 |
| 2.50 | 31.9 | 31.4 | 31.1 | 31.5 |
| 3.00 | 31.7 | 31.1 | 30.8 | 31.2 |
| 3.50 | 31.4 | 31.1 | 30.6 | 31.0 |
| 4.00 | 31.3 | 31.0 | 30.5 | 30.9 |
| 5.00 | 31.2 | 31.0 | 30.5 | 30.9 |
| 6.00 | 31.0 | 30.8 | 30.3 | 30.7 |
| 7.00 | 31.6 | 31.4 | 30.8 | 31.3 |
| 8.00 | 32.4 | 32.3 | 31.6 | 32.1 |
| 9.00 | 32.9 | 32.9 | 32.2 | 32.7 |
| 10.00 | 33.1 | 33.2 | 32.5 | 32.9 |
| 11.00 | 33.4 | 33.4 | 32.6 | 33.1 |

TABLE 11

Temperatures (° C.) of the untreated (control) tissue surface recorded by three probe thermometers over an 11 minute experimental duration (with 10 second intervals during the first minute, followed by 15 s intervals in the second minute and 30 s intervals in the third and fourth minutes). Data are shown for replicate #3.

| Time | Temperature (° C.) Control - Replicate #3 | | | |
|---|---|---|---|---|
| (Minutes) | Probe 1 | Probe 2 | Probe 3 | Average |
| 0.00 | 33.1 | 33.4 | 32.9 | 33.1 |
| 0.17 | 33.1 | 33.4 | 32.8 | 33.1 |
| 0.33 | 32.9 | 33.2 | 32.6 | 32.9 |
| 0.50 | 32.4 | 32.6 | 32.0 | 32.3 |
| 0.67 | 32.0 | 32.2 | 31.6 | 31.9 |
| 0.83 | 31.7 | 31.9 | 31.4 | 31.7 |
| 1.00 | 31.4 | 31.6 | 31.1 | 31.4 |
| 1.25 | 31.1 | 31.3 | 30.8 | 31.1 |
| 1.50 | 30.9 | 31.0 | 30.5 | 30.8 |
| 1.75 | 30.7 | 30.8 | 30.4 | 30.6 |
| 2.00 | 30.6 | 30.6 | 30.4 | 30.5 |
| 2.50 | 30.2 | 30.3 | 30.0 | 30.2 |
| 3.00 | 30.0 | 30.1 | 29.8 | 30.0 |
| 3.50 | 30.0 | 30.1 | 29.8 | 30.0 |
| 4.00 | 29.9 | 30.0 | 29.8 | 29.9 |
| 5.00 | 29.6 | 29.8 | 29.5 | 29.6 |
| 6.00 | 29.5 | 29.7 | 29.3 | 29.5 |
| 7.00 | 29.9 | 30.0 | 29.6 | 29.8 |
| 8.00 | 30.8 | 31.2 | 30.5 | 30.8 |
| 9.00 | 31.5 | 31.9 | 31.2 | 31.5 |
| 10.00 | 31.9 | 32.3 | 31.7 | 32.0 |
| 11.00 | 32.1 | 32.4 | 31.8 | 32.1 |

TABLE 12

Average temperature (° C.) of the tissue surface recorded by probe thermometers over an 11 minute experimental duration (with 10 second intervals during the first minute, followed by 15 s intervals in the second minute and 30 s intervals in the third and fourth minutes) after application of 300 mg and 800 mg of MED3000 composition to the tissue.

| Time | Temperature (° C.) MED3000 (BN: 3SS) | | | | | |
|---|---|---|---|---|---|---|
| | 300 mg | | | 800 mg | | |
| (Minutes) | n = 1 | n = 2 | n = 3 | n = 1 | n = 2 | n = 3 |
| 0.00 | 32.9 | 33.0 | 32.8 | 32.6 | 32.7 | 32.9 |
| 0.17 | 31.8 | 32.1 | 31.9 | 31.2 | 30.6 | 30.1 |
| 0.33 | 31.4 | 31.1 | 30.7 | 30.6 | 29.5 | 28.7 |
| 0.50 | 31.0 | 30.6 | 30.1 | 30.2 | 29.1 | 28.6 |
| 0.67 | 30.3 | 30.0 | 29.6 | 30.0 | 28.8 | 28.5 |
| 0.83 | 29.5 | 29.5 | 29.1 | 29.8 | 28.7 | 28.3 |
| 1.00 | 28.9 | 29.1 | 28.7 | 29.5 | 28.6 | 27.9 |
| 1.25 | 28.3 | 28.7 | 28.4 | 29.1 | 28.3 | 27.6 |
| 1.50 | 28.0 | 28.3 | 28.1 | 28.7 | 28.0 | 27.6 |
| 1.75 | 27.9 | 27.9 | 27.8 | 28.3 | 27.9 | 27.3 |
| 2.00 | 27.8 | 27.6 | 27.5 | 28.0 | 27.8 | 27.1 |
| 2.50 | 27.2 | 26.9 | 27.5 | 27.4 | 27.5 | 26.9 |
| 3.00 | 26.8 | 26.7 | 26.9 | 27.0 | 26.9 | 26.4 |
| 3.50 | 26.1 | 26.5 | 27.1 | 27.0 | 26.6 | 25.9 |
| 4.00 | 26.0 | 26.4 | 26.7 | 26.5 | 26.4 | 25.6 |
| 5.00 | 25.9 | 26.3 | 26.8 | 26.2 | 26.1 | 25.6 |
| 6.00 | 25.7 | 26.1 | 26.7 | 26.3 | 26.0 | 25.4 |
| 7.00 | 27.9 | 28.4 | 27.6 | 26.5 | 26.8 | 27.1 |
| 8.00 | 30.1 | 29.9 | 29.1 | 28.3 | 28.5 | 29.0 |
| 9.00 | 31.1 | 30.8 | 29.9 | 29.4 | 29.5 | 30.1 |
| 10.00 | 31.7 | 31.2 | 30.4 | 30.1 | 30.2 | 30.7 |
| 11.00 | 32.0 | 31.6 | 30.9 | 30.6 | 30.7 | 31.0 |

TABLE 13

Average mean temperature (° C.) of the tissue surface recorded for all replicates for 300 mg doses, 800 mg doses and the controls by probe thermometers over an 11 minute experimental duration (with 10 second intervals during the first minute, followed by 15 s intervals in the second minute and 30 s intervals in the third and fourth minutes).

| Time | Temperature (° C.) MED3000 (BN: 3SS) | | |
|---|---|---|---|
| (Minutes) | Average 300 mg | Average 800 mg | Average Control |
| 0.00 | 32.9 | 32.7 | 33.3 |
| 0.17 | 31.9 | 30.6 | 33.3 |
| 0.33 | 31.1 | 29.6 | 33.1 |
| 0.50 | 30.6 | 29.3 | 32.7 |
| 0.67 | 29.9 | 29.1 | 32.3 |
| 0.83 | 29.4 | 28.9 | 32.1 |
| 1.00 | 28.9 | 28.7 | 31.9 |
| 1.25 | 28.5 | 28.3 | 31.6 |
| 1.50 | 28.1 | 28.1 | 31.4 |
| 1.75 | 27.9 | 27.8 | 31.2 |
| 2.00 | 27.6 | 27.6 | 31.1 |
| 2.50 | 27.2 | 27.3 | 30.8 |
| 3.00 | 26.8 | 26.8 | 30.6 |
| 3.50 | 26.6 | 26.5 | 30.5 |
| 4.00 | 26.3 | 26.2 | 30.4 |
| 5.00 | 26.3 | 26.0 | 30.2 |
| 6.00 | 26.2 | 25.9 | 30.1 |
| 7.00 | 28.0 | 26.8 | 30.6 |
| 8.00 | 29.7 | 28.6 | 31.5 |
| 9.00 | 30.6 | 29.7 | 32.1 |
| 10.00 | 31.1 | 30.3 | 32.4 |
| 11.00 | 31.5 | 30.8 | 32.6 |

Data Analysis

An immediate decrease in temperature was observed with a maximum temperature drop of 7.5° C. (average 6.8° C.) achieved during the cooling phase of the experiment (recorded at the 6-minute timepoint) across both dose volumes followed by a gradual increase in temperature over the experimental duration. The greatest temperature decrease was observed when the 800 mg dose of MED3000 was applied to the tissue (ca. 7.5° C. decrease from the initial starting temperature of ca. 32° C. after 6 minutes). For the 300 mg dose, a decrease of ca. 7.2° C. from the starting temperature was achieved after 6 minutes.

In the first 2 minutes post-application of the composition, a maximum temperature drop of 5.9° C. was observed at the 2-minute timepoint when the tissue surface was dosed with 800 mg gel; the average temperature drops for the 300 mg dose and the 800 mg dose at the 2-minute timepoint were 5.3° C. and 5.1° C. respectively. In contrast, over the initial 2-minute timeframe the controls exhibited an average temperature drop of 2.2° C.

Over the experimental duration, the composition-induced temperature drop reached a plateau after approximately 6 minutes, with a maximum temperature drop of 7.5° C. observed at the 6-minute timepoint when the tissue surface was dosed with 800 mg. The average temperature drops at the 6-minute timepoint for the 300 mg dose and the 800 mg dose were 6.7° C. and 6.8° C. respectively. In contrast, over the initial 6-minute timeframe the controls exhibited an average temperature drop of 3.2° C.

After 6 minutes, when the composition-induced temperature drop had plateaued, the recovery phase was monitored for a further 5 minutes-until a temperature near the starting temperature was reached. It was observed that the tissue temperature recovery rate following application of a 300 mg dose was marginally faster than that after application of an 800 mg dose. This is to be expected as a smaller mass of gel has a smaller residual thermal capacity.

Measurements from the three surface probes were consistent at any given time-point, demonstrating uniformity of composition effect across the surface of the tissue. For all replicates of both doses and the control, the RSD did not exceed 5% at any time point, and in the majority of cases was less than 3.5%.

Data were highly consistent between the study replicates. For the 300 mg dose, the relative standard deviation (RSD) did not exceed 2.1%. For the 800 mg dose, RSD did not exceed 3.3%. For the untreated tissue control, RSD did not exceed 2.4%.

Discussion/Conclusions

An evaluation of the spatio-temporal temperature changes on ex vivo tissue following application was successfully performed for the MED3000 composition, at two dose strengths, to further demonstrate the thermal characteristics of the composition, specifically that the composition exerts a rapid cooling effect followed by a slower recovery warming effect.

The results from the ex vivo experiment indicate that—at both dose levels evaluated—MED3000 composition achieved a rapid cooling effect, followed by a gradual increase in temperature, providing further support for the claimed mechanism of composition action.

Post application of the composition, immediate cooling of the tissue surface was observed. Cooling effects continued for several minutes reaching a maximum temperature drop of 7.5° C. after approximately 6 minutes. After 6 minutes, skin surface temperatures were observed to recover, with a complete return to starting temperatures reached approximately 11 minutes post-application.

No appreciable difference in the thermal effects on tissue were observed between 300 mg and 800 mg doses. It should be noted that whilst 300 mg represents the ideal dose, the results indicate that an 800 mg dose will also be safe and effective in the unlikely event that an increased amount of gel is extracted during patient use.

Untreated tissue controls (n=3) were run to demonstrate that the study conditions—particularly occlusion of the water bath—were not responsible for the purported composition effect. The control results—generated under identical experimental conditions to the treated tissue—provide confidence that the thermal profile assigned to the MED3000 composition is a true composition effect.

Figure 12:
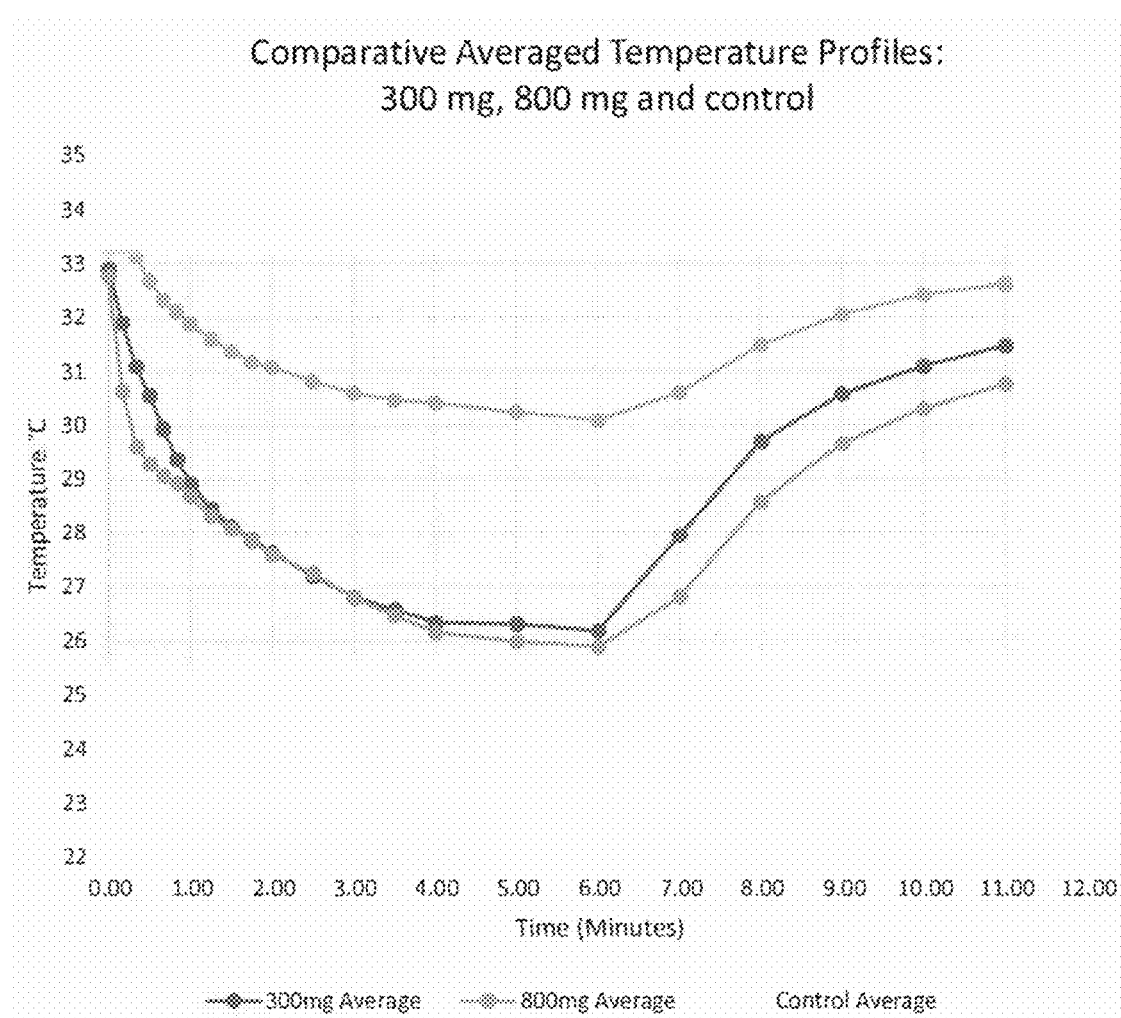
FIG. 12 shows the comparative temperature (° C.) profile expressed as the mean average of 3 replicates, for 300 mg dose, 800 mg dose and untreated control.

In illustration of this point, FIG. 12 shows a comparison of the average temperature profile (mean of 3 replicates) for each dose (300 mg and 800 mg) versus the control.

In view of the many possible embodiments to which the principles of the disclosed invention may be applied, it should be recognised that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A method of testing a topical composition, wherein the method comprises:
   providing an ex vivo tissue comprising a skin tissue layer and a muscle tissue layer, wherein at least one temperature probe is positioned on a surface of the skin tissue layer;
   adjusting the temperature of the ex vivo tissue such that the temperature at the surface of the skin tissue layer is 32-37° C.;
   applying the topical composition to the surface of the skin tissue layer, wherein the topical composition effects a decrease in temperature at the surface of the skin tissue layer;
   measuring the decrease in temperature at the surface of the skin tissue layer over time effected by the topical composition using the at least one temperature probe; and
   measuring a subsequent increase in temperature at the surface of the skin tissue layer over time using the at least one temperature probe.

2. A method according to claim 1, wherein the topical composition is for treating erectile dysfunction.

3. A method according to claim 1, wherein the at least one temperature probe comprises at least three temperature probes positioned on the surface of the skin tissue layer.

4. A method according to claim 3, wherein a first of the at least three temperature probes is positioned at a center of the surface of the skin tissue layer.

5. A method according to claim 4, wherein a second and a third of the at least three temperature probes are positioned at opposite edges of the surface of the skin tissue layer.

6. A method according to claim 1, wherein at least one reference temperature probe is positioned within the muscle tissue layer.

7. A method according to claim 1, wherein the temperature of the ex vivo tissue is adjusted such that the temperature at the surface of the skin tissue layer is 32-34° C.

8. A method according to claim 1, wherein the ex vivo tissue is ex vivo mammalian tissue.

9. A method according to claim 8, wherein the ex vivo tissue is ex vivo porcine tissue.

10. A method according to claim 1, wherein a 200-400 mg dose of the topical composition is applied to the surface of the skin tissue layer.

11. A method according to claim 1, wherein the area of application of the topical composition has a surface area of 10-15 cm$^2$.

12. A method according to claim 1, wherein the area of the surface of the skin tissue layer is 30-100 cm$^2$.

13. A method according to claim 1, wherein the decrease in temperature at the surface of the skin tissue layer is measured for 3-8 minutes.

14. A method according to claim 1, wherein the subsequent increase in temperature at the surface of the skin tissue layer is measured for 3-8 minutes.

15. A method according to claim 1, wherein the decrease and subsequent increase in temperature at the surface of the skin tissue layer is measured for a total of 6-16 minutes.

16. A method according to claim 15, wherein the decrease and subsequent increase in temperature at the surface of the skin tissue layer is measured for a total of 10-12 minutes.

17. A method according to claim 1, wherein the decrease and subsequent increase in temperature at the surface of the skin tissue layer is measured for the time taken for the temperature at the surface of the skin tissue layer to return to 32-37° C.

18. A method according to claim 1, wherein adjusting the temperature of the ex vivo tissue comprises partially submerging the ex vivo tissue in a thermal bath such that the muscle tissue layer is submerged in the thermal bath and the surface of the skin tissue layer is exposed to air.

19. A method according to claim 18, wherein the thermal bath is maintained at 36-40° C.

20. A method according to claim 18, wherein a cover is positioned on the thermal bath during the adjusting step and removed from the thermal bath during the applying and measuring steps.

21. A method of testing a topical composition, wherein the method comprises:

providing an ex vivo porcine tissue comprising a skin tissue layer and a muscle tissue layer, wherein at least three temperature probes are positioned on a surface of the skin tissue layer;

adjusting the temperature of the ex vivo porcine tissue such that the temperature at the surface of the skin tissue layer is 32-37° C.;

applying a topical composition to the surface of the skin tissue layer, wherein the topical composition effects a decrease in temperature at the surface of the skin tissue layer;

measuring the decrease in temperature at the surface of the skin tissue layer for at least 3 minutes using the at least three temperature probes; and measuring a subsequent increase in temperature at the surface of the skin tissue layer for at least 3 minutes using the at least three temperature probes.

* * * * *